US006885877B1

(12) United States Patent
Ozaki et al.

(10) Patent No.: US 6,885,877 B1
(45) Date of Patent: Apr. 26, 2005

(54) PORTABLE COMMUNICATION DEVICE AND SYSTEM USING THE PORTABLE COMMUNICATION DEVICE AND ATTACHMENT FOR A PORTABLE COMMUNICATION DEVICE

(75) Inventors: Toru Ozaki, Kawasaki (JP); Masami Mizutani, Kawasaki (JP); Shigeru Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/358,546

(22) Filed: Jul. 22, 1999

(30) Foreign Application Priority Data

Dec. 18, 1998 (JP) .......................................... 10-361615

(51) Int. Cl.[7] ................................................ H04B 1/38

(52) U.S. Cl. ............................... 455/556.1; 455/556.2; 455/346; 455/406; 705/40

(58) Field of Search .......................... 455/556.1, 556.2, 455/406, 419, 575.1, 550.1, 423, 411, 414.1, 408, 151.2, 346, 557, 348, 347, 556, 537; 705/39, 40; 370/230, 235, 395.21, 395.43, 395.42; 379/57, 58, 428–433, 368, 441; 380/202

(56) References Cited

U.S. PATENT DOCUMENTS

| | | | | |
|---|---|---|---|---|
| 4,833,702 A | * | 5/1989 | Shitara et al. ................. | 379/60 |
| 5,241,161 A | * | 8/1993 | Zuta ............................ | 235/382 |
| 5,724,655 A | * | 3/1998 | Grube et al. ................. | 455/419 |
| 5,748,720 A | * | 5/1998 | Loder .......................... | 379/144 |
| 5,887,249 A | * | 3/1999 | Schmid ....................... | 455/411 |
| 5,887,266 A |   | 3/1999 | Heinonen et al. ............ | 455/585 |
| 5,933,776 A | * | 8/1999 | Kirkpatrick .................. | 455/423 |

(Continued)

FOREIGN PATENT DOCUMENTS

| | | | | |
|---|---|---|---|---|
| DE | 0790749 A | * | 8/1997 | ............ H04Q/7/32 |
| JP | 6-501329 |   | 2/1994 | |
| JP | 06-121075 |   | 4/1994 | |

(Continued)

OTHER PUBLICATIONS

Communication from the European Patent Office dated Mar. 28, 2003 including European Search Report.
Japanese Office Action mailed on Aug. 26, 2003 in Japanese Patent Application No. 10-361615.
Japanese Office Action for corresponding Japanese Application, dated Sep. 29, 2004. (Japanese document is not received.).

Primary Examiner—Edward F. Urban
Assistant Examiner—Charles Chow
(74) Attorney, Agent, or Firm—Staas & Halsey LLP

(57) ABSTRACT

A portable communication device is used in a digital money system so as to pay for purchase by digital money by using the portable communication device. A remote communication interface interfaces radio-frequency communication with a remote communication terminal. A short-distance communication interface interfaces wireless communication with a communication terminal located in the vicinity of the portable communication device. Data or instruction information is input to the portable communication terminal by an inputting unit such as a key panel. The data is stored in a memory and is displayed on a display unit such as an LCD. An enciphering and deciphering circuit enciphers or deciphers the data to be transmitted or received so as to maintain security.

15 Claims, 19 Drawing Sheets

U.S. PATENT DOCUMENTS

| | | | | |
|---|---|---|---|---|
| 5,950,172 A | * | 9/1999 | Klingman | 705/26 |
| 5,991,410 A | * | 11/1999 | Albert et al. | 380/24 |
| 6,073,005 A | * | 6/2000 | Raith et al. | 455/404 |
| 6,078,806 A | * | 6/2000 | Heinonen et al. | 455/406 |
| 6,098,055 A | * | 8/2000 | Watanabe | 705/73 |
| 6,101,378 A | * | 8/2000 | Barabash et al. | 455/406 |
| 6,119,931 A | * | 9/2000 | Novogrod | 235/379 |
| 6,169,890 B1 | * | 1/2001 | Vatanen | 455/406 |
| 6,215,875 B1 | * | 4/2001 | Nohda | 380/202 |
| 6,230,214 B1 | * | 5/2001 | Liukkonen et al. | 710/1 |
| 6,250,557 B1 | * | 6/2001 | Forslund et al. | 235/492 |
| 6,332,133 B1 | * | 12/2001 | Takayama | 705/39 |
| 6,516,466 B1 | * | 2/2003 | Jackson | 725/62 |

FOREIGN PATENT DOCUMENTS

| | | | | |
|---|---|---|---|---|
| JP | 08-018656 | | 1/1996 | H04M/7/38 |
| JP | 08-087655 | | 4/1996 | G07F/7/08 |
| JP | 8-153248 | | 6/1996 | G07F/7/02 |
| JP | 9-36972 | | 2/1997 | H04M/11/00 |
| JP | 09-212725 | | 8/1997 | |
| JP | 10-078989 | | 3/1998 | |
| JP | 3051748 | | 6/1998 | |
| JP | 10285657 | * | 10/1998 | H04Q/7/38 |
| WO | WO 92/11598 | | 7/1992 | |
| WO | WO 98/34203 | | 8/1998 | G07F/19/00 |
| WO | WO 00/31699 | | 6/2000 | G07F/7/10 |

* cited by examiner

FIG. 2

| NUMBER | NAME |
|---|---|
| 004-751-2134 | TARO FUJI |
| ⋮ | ⋮ |

FIG. 4

| |
|---|
| APPLICATION PROGRAM<br>(STORE PROGRAMS REGARDING DIGITAL MONEY) |
| PERSONAL ATTRIBUTE INFORMATION<br>(STORE PERMANENTLY UNTIL BEING CHANGED)<br>(EXTERNALLY OUTPUT NECESSARY DATA)<br>(STORE ENCIPHERED DATA SUCH AS ACCOUNT NUMBER) |
| PERSONAL ATTRIBUTE INFORMATION<br>(STORE PERMANENTLY UNTIL BEING CHANGED)<br>(USED WITH IN TELEPHONE) |
| REGISTRATION DATA<br>(TEMPORARILY STORE PERSONALLY SELECTED INFORMATION, AND TRANSFER THE DATA TO SERVER TO RECEIVE SERVICE) |
| SERVICE TICKET INFORMATION<br>(TEMPORARILY STORE INFORMATION PROVIDED BY STORE INFORMATION PROVIDED BY STORE, AND DELETE AFTER COMPLETION OF SERVICE)<br>(STORE ENCIPHERED DATA SUCH AS TICKET NUMBER) |

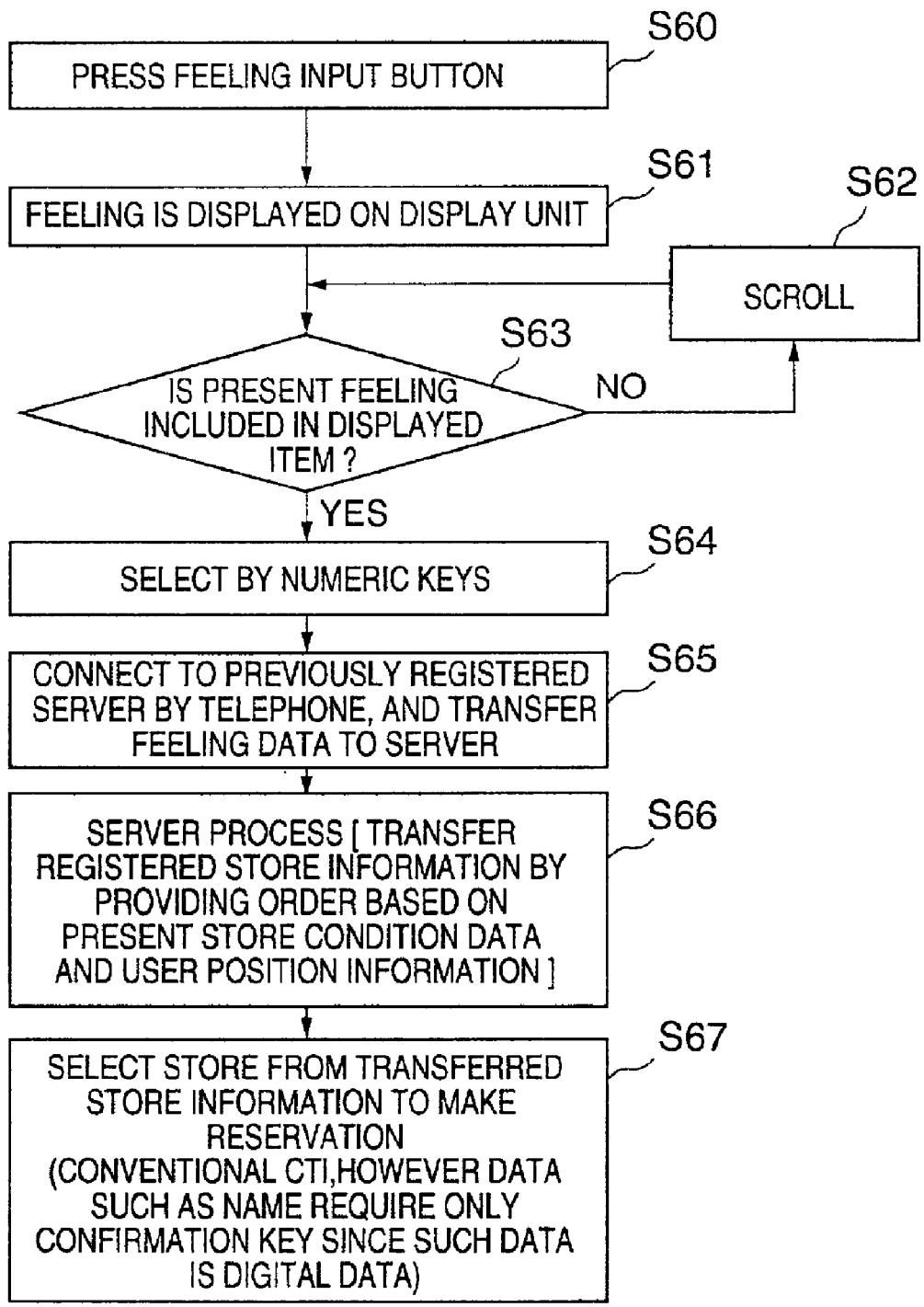

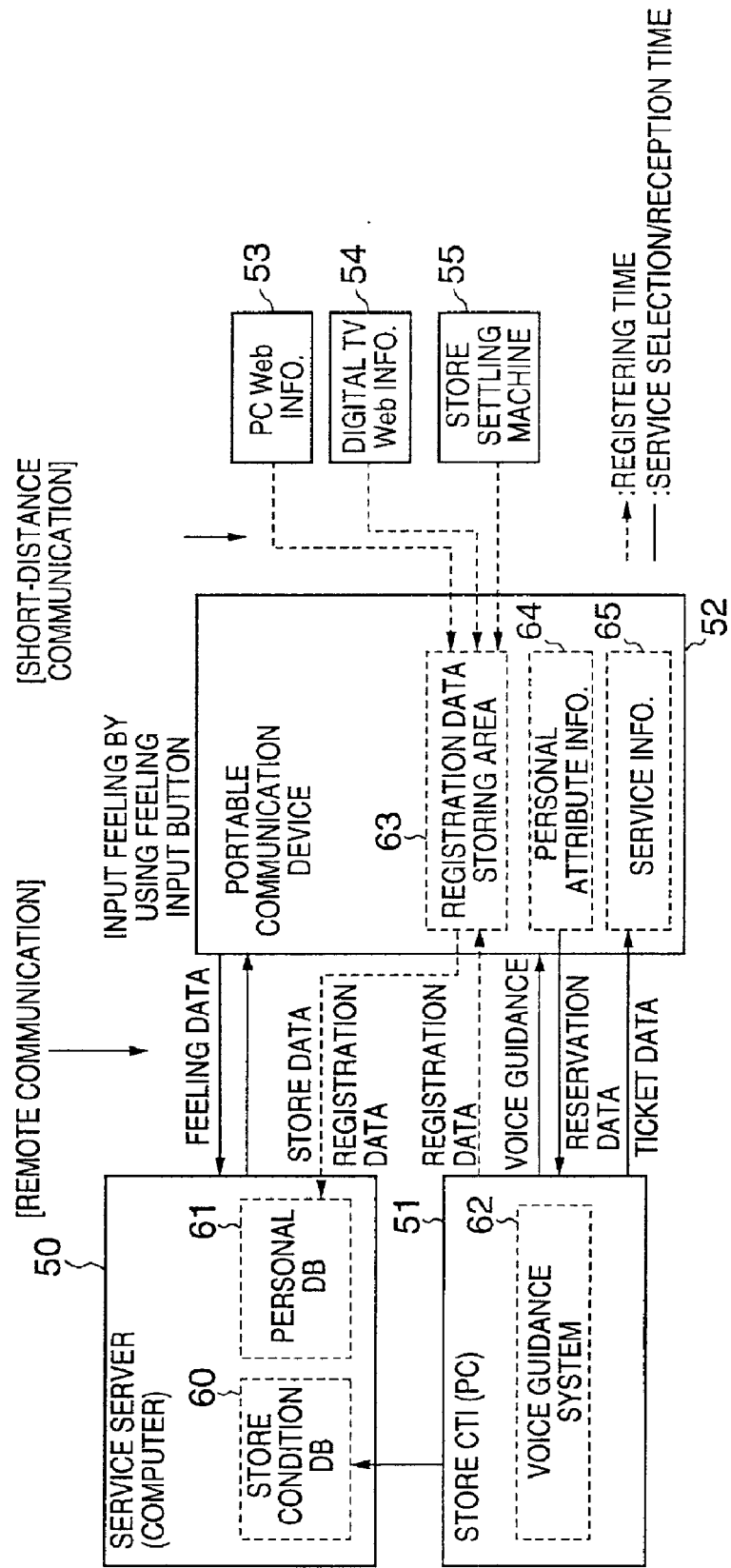

PORTABLE COMMUNICATION DEVICE AND SYSTEM USING THE PORTABLE COMMUNICATION DEVICE AND ATTACHMENT FOR A PORTABLE COMMUNICATION DEVICE

BACKGROUND OF THE INVENTION

1. Field of the Invention

The present invention relates to a portable communication device and a system using the portable system that are utilized for achieving electric commerce using digital money. The present invention also relates to an attachment for a portable communication device which enables the portable communication device to be utilized for achieving electric commerce using digital money.

2. Description of the Related Art

As the Internet has become popular worldwide, movement of use of electric commerce utilizing the Internet has grown.

Conventionally, an electronic card is used for payment. A Mondex method is known in "(a) a home banking system using an IC card". In this system, payment is done by an IC card, and deposit or transmittal of digital money can be done by using a home use telephone.

Additionally, an IC card having a portable telephone function is disclosed in Japanese Laid-Open Applications No. 8-153248 and No. 9-36972.

(b) Japanese Laid-Open Patent Application No. 8-153248 discloses an invention related to an automatic vending machine system using a deferred payment method using a portable telephone terminal, the title of the invention being "automatic vending machine system".

(c) Japanese Laid-Open Patent Application No. 9-36972 discloses an invention related to a technique for adding a portable telephone function to an IC card, the title of the Invention being "complex IC card".

Additionally, the following examples enable a digital information service by having a communication function of the portable telephone to process data other than a function such as a codec function necessary for communication.

(d) a combination of a notebook-type personal computer and a portable telephone (e) a combination of an electronic diary or a personal digital assistant (PDA) and a portable telephone.

However, in the usage of the above-mentioned cases (d) and (e), the portable telephone can be used only as a data communication means.

A description will now be given, with reference to FIG. 1, of a known PHS (personal handy-phone system) as a portable telephone having a data communication means.

The PHS shown in FIG. 1 comprises an antenna 1, a communication I/F 2, a modem 3, an audio codec DSP 4, a digital/analog converter 5, a microphone 6, a speaker 7, a liquid crystal display (LCD) 8, a key pad (KEY) 9, a light emitting diode (LED) 10, an external connector 11, a memory 12, a micro processing unit (MPU) 13, a protocol controller 14, a panel I/F 16. It should be noted that the audio codec DSP 4 and the digital/analog converter 5 together are referred to as a codec 15.

The communication I/F 2 controls the antenna 1 which receives radio frequency from a remote place and emits radio frequency to a remote place.

The modem 3 converts data to be transmitted into high-frequency signal and converts a received high-frequency signal into a base band signal.

The codec DSP 4 digitally processes a digital audio signal. The digital/analog converter 5 converts the audio signal into a digital audio signal, and the received digital audio signal into an analog audio signal.

The memory 12 stores data such as telephone number. FIG. 2 shows telephone number diary information stored in the memory 12.

The MPU 13 performs application programs such as a control program of a portable telephone or an address diary program.

The protocol controller 14 determines a data path. For example, the protocol controller 14 determines a data path so at to send data received by the antenna 1 to an external device via the external connector 11 or outputs the data to the speaker 7 via the codec 15.

The codec 15 converts the received digital audio signal into the analog audio signal so as to outputs the analog audio signal to the speaker 7, and converts an analog sound input to the microphone 6 into a digital audio signal.

When an audio signal is transmitted from the PHS to a remote telephone, the sound is detected by the microphone 6, and is transmitted to the remote telephone via the digital/analog converter 5, the audio codec DSP 4, the modem 3, the communication I/F 2 and the antenna 1.

Additionally, when data stored in the memory 12 is transmitted to a remote data communication terminal, the data is transmitted from the memory 12 to the remote data communication terminal via the MPU 13, the protocol controller 14, the modem 3, the communication I/F 2 and the antenna 1.

An audio signal transmitted by a remote telephone is received by the antenna 1, and a sound is generated by the speaker 7 via the communication I/F 2, the modem 3, the audio codec DSP 4 and the digital/analog converter 5.

Additionally, data transmitted by a remote data communication terminal is received by the antenna 1, and is output to an external device via the communication I/F 2, the modem 3, the protocol controller 14 and the external connector 11.

Accordingly, considering the PHS, in the above-mentioned modes of usage (d) and (e), data communication with an external notebook-type personal computer, an electronic diary or a PDA is merely achieved by the transfer of data via the portable communication I/F 2, the modem 3, the protocol controller 14 and the external connector 11.

There are following conventional cases that use a combination of portable communication devices.

(f) a combination of a GSM (global system for mobile communications) and a SIM (subscriber identity module card)

(g) a combination of a PDA and a keyboard

The GSM in the case (f) is a portable telephone mainly used in European countries, and a card reader is incorporated in a main body which card reader is for reading a prepaid card referred to as a SIM card. Thereby, one can make a telephone call by borrowing a portable telephone owned by another person as if the portable telephone is a public telephone.

Additionally, in the case (g), as an example of a case in which a close contact type keyboard is attached to a PDA, there is a combination of a Palm Pilot manufactured by 3COM company and a single hand keyboard manufactured by Fujitsu Co, Ltd.

In the above-mentioned case (a) which is the "home banking system using an IC card", a function of payment for purchase is provided, but money (digital cash) must be deposited in the electronic card (IC card) which is inconvenient for a user.

For example, in the home banking system using the Mondex method, a user must purchase a new telephone having an interface for an electronic card so as to deposit digital cash in the electronic card. Additionally, the user must purchase an exclusive attachment.

The electronic card is not provided with a function for communication by voice, and cannot accept an instruction by voice.

In the above-mentioned case (b) which is the invention disclosed in Japanese Laid-Open Patent Application No. 8-153248, payment for purchase is made by a deferred payment, and digital money cannot be used. Additionally, the invention disclosed in this patent document does not provide a communication function which is inconvenient for a user.

Additionally, in the deferred payment, if an amount of payment exceeds a payment capacity, there is no means for checking such a condition. Accordingly, a payment exceeding a payment capacity cannot be prevented.

In the above-mentioned case (c) which is the invention disclosed in Japanese Laid-Open Patent Application No. 9-36972, a technology of a complex IC card which combines the function of an IC card and the function of a portable telephone is disclosed. In this patent document, since an enciphering and deciphering function which necessary for handling digital money is not disclosed, the digital money cannot be used. Additionally, it is unclear how to use the digital money.

Accordingly, in order to use the digital money, the following issues are present.

(1) deposit and withdraw of the digital money must be easy.

(2) a support must be made such as a voice guidance in order to improve an operability.

(3) an immediate payment must be made within a deposit in a financial institution.

(4) A necessary security must be provided.

The above-mentioned cases (d) and (e) and a handset of the PHS has a communication function but does not have a function to receive and pay money (digital cash). In order to receive and pay money, functions such as a data storing function, an enciphering function for communication or a selecting function to select data to be transmitted must be provided. However, conventional portable telephones do not have such functions.

Further, in order to achieve an information service system including a portable communication device which can be used by any one at any time and any place, portability must be important. Accordingly, such a portable telephone is required to be less than 1.5 times the conventional popular portable telephones with respect to its volume and weight. In this respect, the above-mentioned cases (d), (e) and (g) are insufficient for solving the above-mentioned issues. Particularly, the electronic diary and the PDA are provided with a display or a key panel, portability is deteriorated as compared to that of a purse. Additionally, a low cost is also one of the necessary elements. It is unacceptable if the price is more than a price of a portable telephone. The above-mentioned cases (d), (e) and (g) are insufficient to solve the above-mentioned issue.

Further, a data processor for receiving an information communication service and a memory for storing data are needed, and also a human I/F for interfacing between the service and an operator is needed. However, a device having only a memory provided in the above-mentioned case (f) is insufficient to cooperate with the human I/F.

Accordingly, the following issues are present in the data communication terminal.

(5) It must have a sufficiently small volume and weight so as to maintain portability.

(6) Both a communication function and an information processing function must be provided. (corresponding to the above-mentioned issue (2))

(7) A human I/F function such as a display function or a speaker function must be usable.

(8) It must be a low price.

SUMMARY OF THE INVENTION

It is a general object of the present invention to provide an improved and useful portable communication device and a system using the portable communication device and an attachment for a portable communication device in which the above-mentioned problems are eliminated.

A more specific object of the present invention is to provide a portable communication device which is preferably used in a digital money system so as to pay for purchase by digital money by using the portable communication device.

Another object of the present invention is to provide a portable communication device which enables instantaneous payment within an amount of deposit in a financial institution.

Another object of the present invention is to provide a portable communication device which enables a digital money transaction with a high-level security.

Another object of the present invention is to provide a service providing system using the above-mentioned portable communication device.

A further object of the present invention is to provide an attachment adapted to be connected to a portable telephone, which attachment enables the portable telephone usable in a digital money system.

In order to achieve the above-mentioned objects, there is provided according to one aspect of the present invention a portable communication device for communicating with a remote communication terminal, comprising:

a remote communication interface interfacing radio-frequency communication with a remote communication terminal;

a short-distance communication interface interfacing wireless communication with a communication terminal located in the vicinity of the portable communication device;

inputting unit inputting data or instruction information to the portable communication terminal;

a memory storing the data input by the inputting unit or data received via the remote communication interface and the short-distance communication interface;

a display unit displaying the data input by the inputting unit or data received via the remote communication interface and the short distance communication interface;

an enciphering circuit enciphering data to be transmitted to the remote communication terminal via the remote communication interface and data to be transmitted via the short-distance communication interface;

a deciphering circuit deciphering data received from the remote communication terminal via the remote communication interface and data received via the short-distance communication interface; and a controlling unit controlling each of the remote communication interface, the short-distance communication interface, the inputting unit, the memory, the display unit, the enciphering circuit and the deciphering circuit.

According to the above-mentioned invention, deposit and withdrawal of digital money can be easily performed by a simple operation by using the portable communication device. Payment by the digital money can be done instantaneously within the deposit in a financial institution. Additionally, digital money can be transferred with a high-level security since the digital money data can be enciphered by the enciphering circuit.

Additionally, there is provided according to another aspect of the present invention a digital money system for using digital money to pay for purchase or service, comprising:

a computer of a financial institution;

a radio base station communicable with the computer of the financial institution;

a store terminal receiving digital money data for payment; and a portable communication device communicable with the radio base station via a radio frequency, the portable communication device also communicable with the store terminal in a wireless manner; and wherein the portable communication device stores the digital money data transmitted from the computer of the financial institution after deciphering the digital money data; and the portable communication device transmits the digital money data for payment to the store terminal after enciphering the digital money data for payment.

According to the above-mentioned invention, the digital money can be transferred from the portable communication device to the store terminal via wireless communication. Additionally, the digital money can be transferred from the financial institution to the portable communication device via radio communication such as a portable or mobile telephone system. Since the digital money data is enciphered before transmission, security is well-maintained.

Additionally, there is provided according to another aspect of the present invention a computer of a financial institution included in a digital money system handling digital money, the digital money system including a radio base station connected to the computer of the financial institution and a portable communication device communicable with the radio base station, the computer of a financial institution comprising:

voice guiding means for providing a voice guidance to a user of the digital money system;

user checking means for checking whether or not the user has a right to use the digital money system:

enciphering means for enciphering data to be transmitted;

deciphering means for deciphering data received from the portable communication device; and communicating means for communicating with the portable communication device via the radio base station, wherein the computer of the financial institution provides to the user a voice guidance by the voice guiding means by receiving signals regarding digital transaction from the portable communication device via the communicating means;

the computer of the financial institution receives enciphered information including customer information and information regarding amount of money from the portable communication device, and deciphers the enciphered information by the deciphering means:

the computer of the financial institution checks whether the user has the right to use the digital money system by the user checking means based on the received customer information; and the computer of the financial institution enciphers digital money data input by the user by the enciphering means when the user is determined to have the right to use the digital money system, and sends the enciphered digital money data to the portable communication device via the communicating means.

The above-mentioned computer is suitable for the digital money system which includes the above-mentioned portable communication device according to the present invention.

Additionally, there is provided according to another aspect of the present invention a service providing system comprising:

a service provider terminal of a provider of service;

a service center including service information storing means for storing information including information regarding various kinds of service which can be provided to a user, information regarding availability of service provided by the provider and information regarding message to be provided to the user, the service center also including determining means for determining whether or not service can be provided to the user based on a present state of the user;

a radio base station connected to the service center; and a portable communication device comprising remote communication means for communication with the radio base station, the portable communication device also comprising inputting means for inputting information regarding a present state of the user, wherein the portable communication device sends the information regarding the present state of the user to the service center by the remote communication means when the information regarding the present state of the user is input by the inputting means; and the service center determines whether or not there is service which can be provided to the user by the determining means when the service center receives the information regarding the present state of the user, and sends the message stored in the service information storing means to the portable communication device when the service which can be provided to the user is present.

According to this invention, the user can send the information regarding the present state of the user such as a feeling of the user to the service center by using the portable communication device. Accordingly, the service center can provide service other than payment by the digital money in accordance with the user's preference.

Additionally, there is provided according to another aspect of the present invention a portable telephone attachment adapted to be connected to a portable telephone having a first external connector, comprising:

a second external connector connectable to the first external connector of the portable telephone; and an arithmetic unit performing a digital process, wherein the portable telephone attachment exchanges signals with the portable telephone via the second external connector, and the arithmetic unit sends a control signal to the portable telephone via the second connector so as to control an inputting and outputting unit of the portable telephone.

According to this invention, the attachment is mounted to the portable telephone by the connecting the second external connector of the attachment to the first external connector of the portable telephone so that various signals can be exchanged between the attachment and the portable telephone.

Additionally, there is provided according to another aspect of the present invention a portable telephone attachment adapted to be connected to a portable telephone having a first external connector, comprising:

a second external connector connectable to the first external connector of the portable telephone; and a central processing unit; and an enciphering and deciphering unit enciphering or deciphering data provided by the central processing unit and returning the enciphered or deciphered data to the central processing unit, wherein the central processing unit exchanges signals with the portable telephone via the second external connector, and the enciphering and deciphering unit deciphers data received by the portable telephone and enciphers data to be transmitted from the portable telephone.

According to this invention, the attachment is mounted to the portable telephone by connecting the second external connector of the attachment to the first external connector of the portable telephone so that the data transmitted from the portable telephone is enciphered and the data received by the portable telephone is deciphered by the enciphering and deciphering unit. Thus, if the data requires to be confidential such as data related to a digital money transaction, security of the data is well-maintained.

Additionally, there is provided according to another aspect of the present invention a portable telephone attachment adapted to be connected to a portable telephone having a first external connector, comprising:

a second external connector connectable to the first external connector of the portable telephone;

a central processing unit;

an enciphering and deciphering unit enciphering or deciphering data provided by the central processing unit and returning the enciphered or deciphered data to the central processing unit;

data/information storing means for storing data and information; and short-distance communication means for communicating with a communication terminal located in the vicinity of the portable telephone in a wireless manner, wherein the central processing unit exchanges signals with the portable telephone via the second external connector, and is accessible to the data/information storing means;

the central processing unit transmits control signals to the portable telephone via the second external connector so as to control an inputting and outputting unit of the portable telephone, and data received by the portable telephone is sent to the portable telephone attachment via the second external connector, and stored in the data/information storing means by the central processing unit;

the data or information stored in the data/information storing means is transmitted to the communication terminal located in the vicinity of the portable telephone via the short-distance communication means upon a request made by the communication terminal; and the enciphering and deciphering unit deciphers data received by the portable telephone and enciphers data to be transmitted from the portable telephone.

According to this invention, the attachment is mounted to the portable telephone by the connecting the second external connector of the attachment to the first external connector of the portable telephone so that various signals can be exchanged between the attachment and the portable telephone. Additionally, the data transmitted from the portable telephone is enciphered and the data received by the portable telephone is deciphered by the enciphering and deciphering unit. Thus, if the data requires to be confidential such as data related to a digital money transaction, security of the data is well-maintained. Further, the data or information such as digital money data stored in the attachment can be transmitted to the communication terminal such as a shop terminal located in the vicinity of the portable telephone via short-distance communication means.

Other objects, features and advantages of the present invention will become more apparent from the following detailed description when read in conjunction with the accompanying drawings.

BRIEF DESCRIPTION OF THE DRAWINGS

FIG. 2 is an illustration for explaining contents of information stored in a memory of a conventional PHS handset;

FIG. 4 is an illustration for explaining contents of information stored in a memory provided in the portable communication device according to the present invention;

FIG. 12 is a flowchart of an operation using the feeling input button;

FIG. 13 is an illustration for explaining exchange of signals between a service server and the portable communication device;

DETAILED DESCRIPTION OF THE PREFERRED EMBODIMENTS

A description will now be given, with reference to the drawings, of embodiments according to the present invention.

The present invention relates to a portable communication device, an attachment for the portable communication device and a system using a portable communication system. Descriptions will be given below of the portable communication device, the system using the portable communication and the attachment for the portable communication device, in that order.

1. Portable Communication Device

Figure 3:
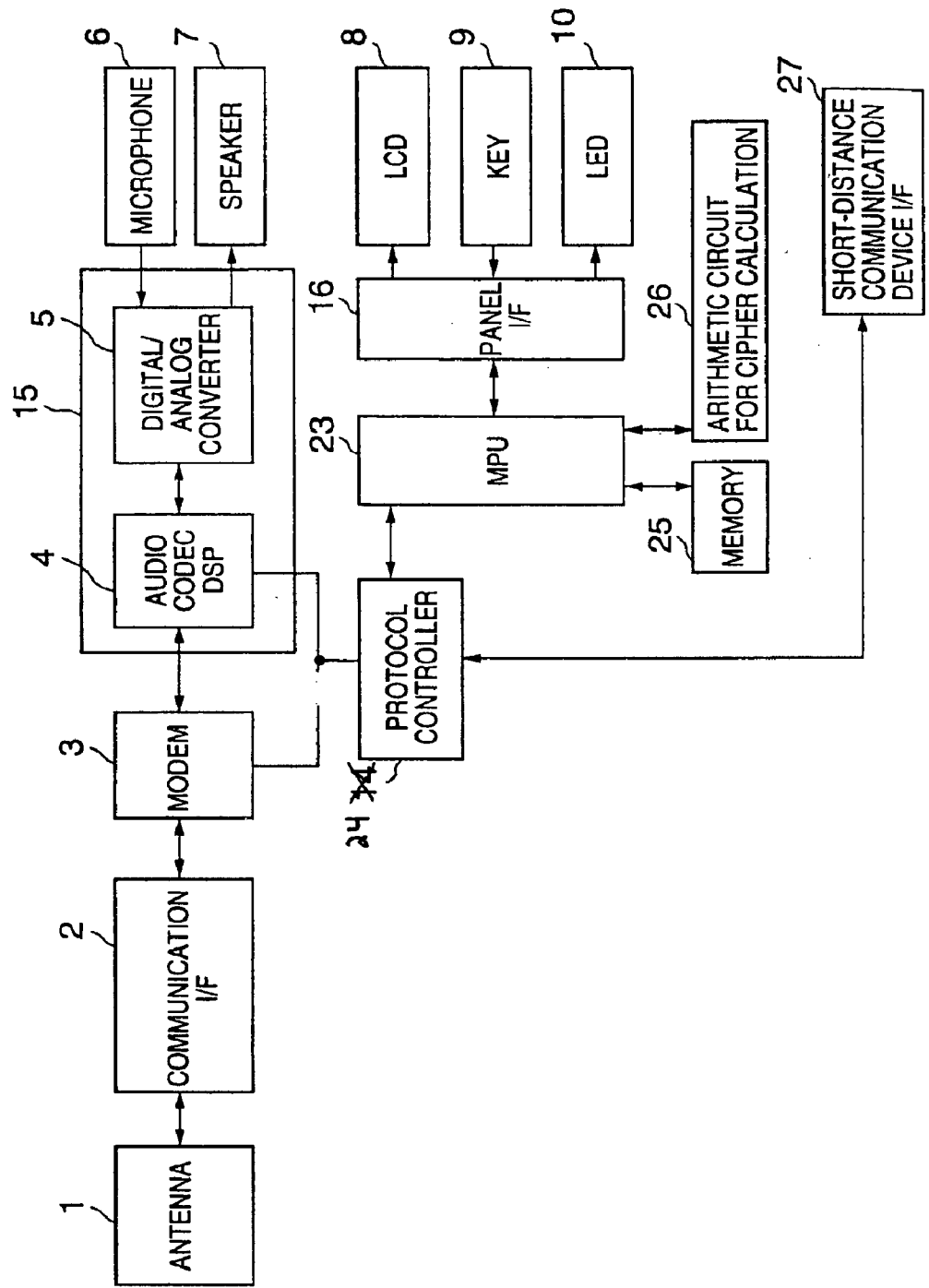
FIG. 3 is a block diagram of a portable communication device according to the present invention.

FIG. 3 is a block diagram of a portable communication device according to the present invention. The portable communication device shown in FIG. 3 is different from the PHS handset shown in FIG. 1 with respect to a multipurpose MPU 23 which can execute programs, a protocol controller 24, a memory 25, an arithmetic circuit 26 exclusive for calculating a cipher, and a short distance communication device I/F 27.

An OS (operating system) is installed in the MPU 23 so that peripheral devices are controlled by the MPU 23. The MPU 23 also executes programs stored in the memory 25.

The protocol controller 24 determines a data path.

The memory 25 stores data such as application programs, name and address of a user, deposited digital cash (data of digital money), digital data of a ticket, and data regarding points given by a store when payment is made. The data stored in the memory 25 is read by the MPU 23, and is output after being processed. FIG. 4 shows contents of data stored in the memory 25. As shown in FIG. 4, the memory 25 stores application programs for receiving various services, personal attribute information, personal telephone book, registered data, service information, etc.

The arithmetic circuit 26 for enciphering is used for enciphering and deciphering data which requires high security such as digital money or application programs for a point card. The data stored in the memory 25 is enciphered if necessary. The arithmetic circuit 26 for enciphering calculation is constituted by an enciphering and deciphering processor so that a method for enciphering and deciphering can be changed by changing software.

The short distance communication device I/F 27 is provided for exchanging data with a device located in a short distance. In this case, the short distance communication device uses an infrared device such as an IrDA.

Communication (access to a computer of a financial institution, withdrawal of digital money) with a financial institution is performed via the antenna 1 as a normal portable telephone. Additionally, communication (payment by digital money, acquisition of points) with a store terminal is performed via the short distance communication device I/F 27.

It should be noted that the display means is not limited to the LCD, and other display means may be used if necessary. Additionally, other data inputting and outputting means may be used if necessary.

The above-mentioned portable communication device is used as a terminal in "2. a system using the portable communication device" described next, and can be a portable telephone provided with an attachment described in "3. Attachment for a portable communication terminal".

A description of a using method of the above-mentioned portable communication device will be given in "2. System using the portable communication device" and "3. Attachment for a portable communication terminal".

2. System Using the Portable Communication Device

A description will now be given of a digital money system as an example of a system using a portable communication device in which system payment for purchase or service is made by digital money.

Figure 5:
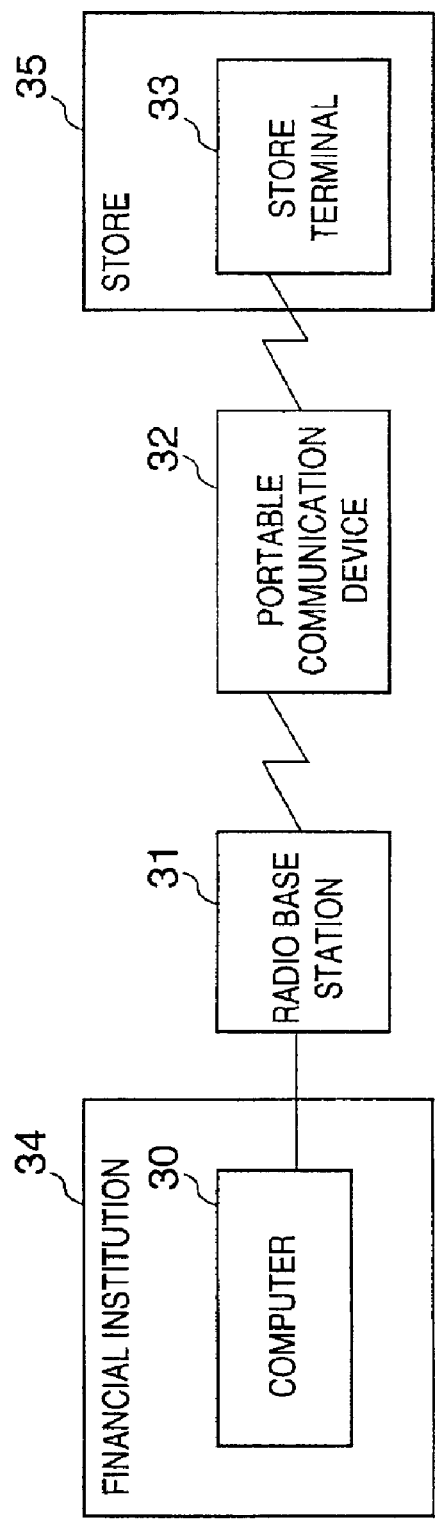
FIG. 5 is a system structure diagram of a digital money system according to the present invention.
Figure 6:
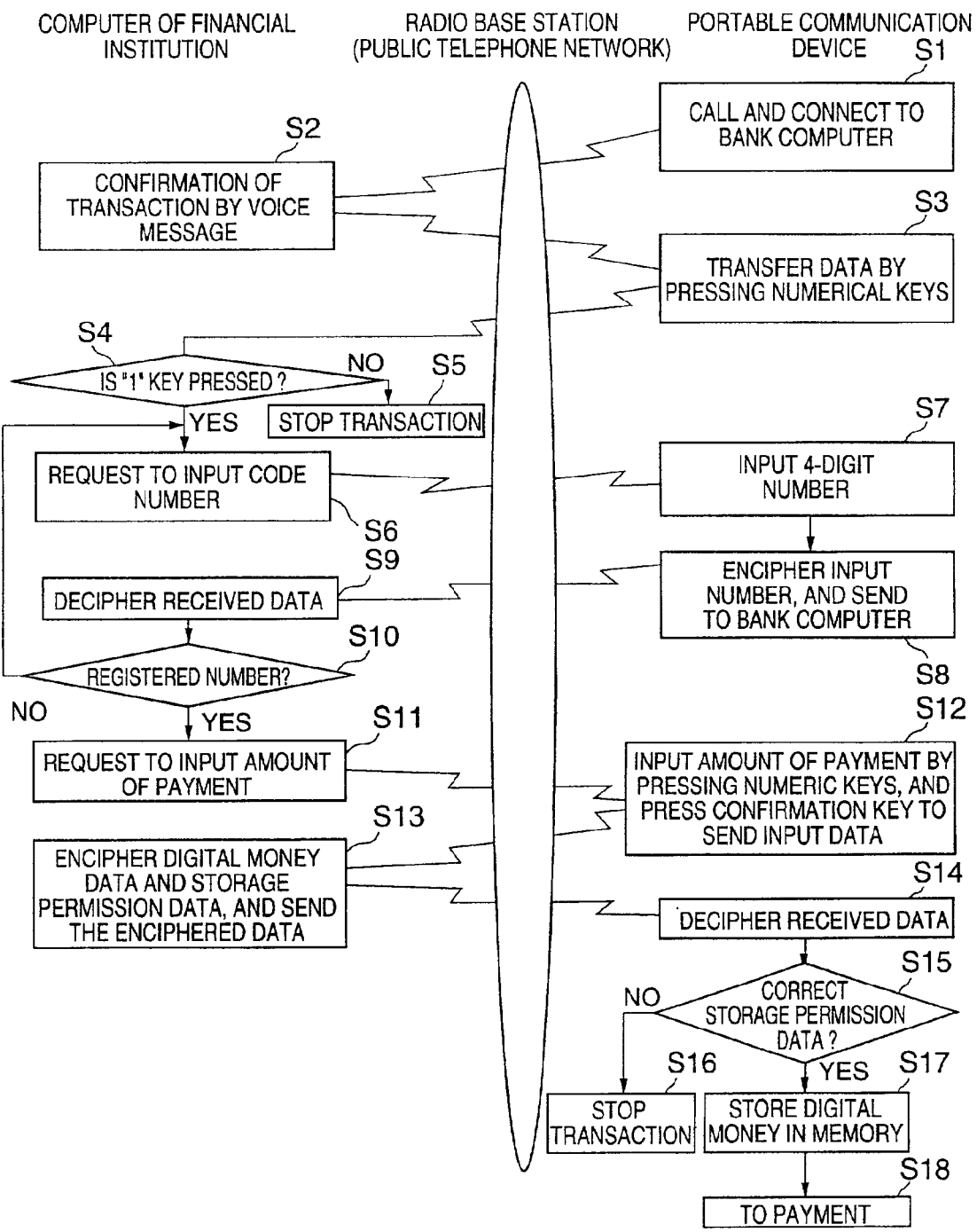
FIG. 6 is a flowchart of operations performed by the portable communication device and a computer of a financial institution when digital money is withdrawn.
Figure 7:
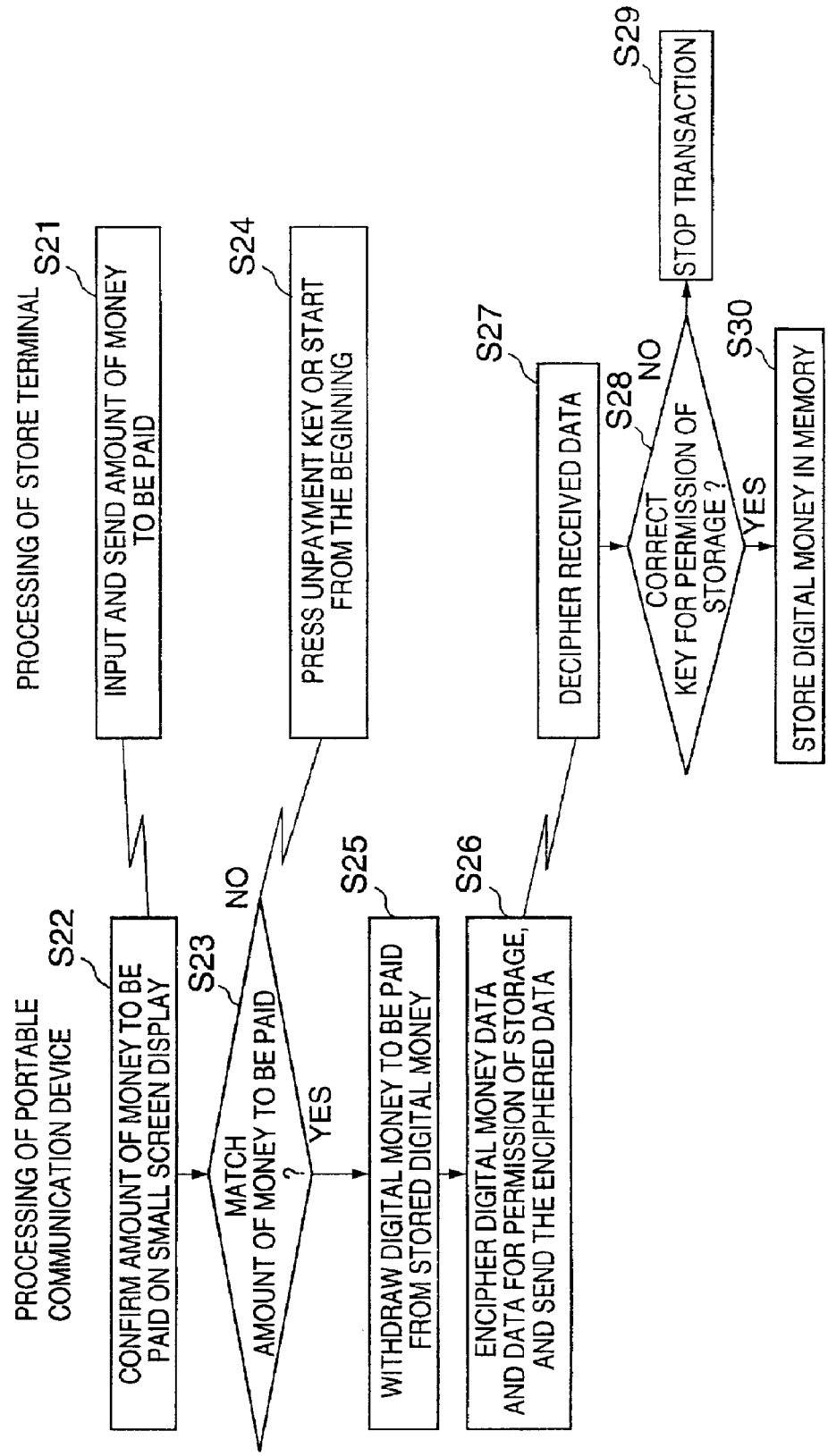
FIG. 7 is a flowchart of an operation performed by the portable communication device and a store terminal when payment is done by digital money.

FIG. 5 shows a structure of a digital money system. FIGS. 6 and 7 shows flowcharts of an operation of the digital money system.

The digital money system shown in FIG. 5 comprises a computer 30 installed in a financial institution, a radio base station 31, a portable communication device 32 and a store terminal 33 installed in a store 35. It should be noted that as for the portable communication device 30, the portable communication device described in the above-mentioned "1. Portable communication device" or the terminal provided with the attachment for the portable communication device described in the "3. Attachment for the portable communication attachment" is used.

The financial institution is not limited to a bank, and means an institution handling money such as a credit association.

The store is the main constituent for selling goods, and includes an automatic vending machine.

The present system constitutes a network, and a public telephone network can be used as such a network. When the public telephone network is used, the radio base station 31 corresponds to a radio base station of a public mobile communication network. The computer 30 of the financial institution and the portable communication device 32 can communicate with each other via the closest radio base station 31 by the public mobile communication network by dialing a telephone number. It should be noted that the present system may independently constitute a network comprising the computer 30 of the financial institution, the radio base station 31, the portable communication device 32 and the store terminal 33 in which the radio base station is provided as a part of the network.

The portable communication device 32 having a purse function (the portable communication device described in the above-mentioned "1. Portable communication device" which is the terminal executing a program of digital money) is provided with a enciphering/deciphering function besides the function of a conventional portable telephone. Additionally the portable communication device 32 is provided with a memory having a capacity sufficient for storing data of digital cash and various sets of user information and a function such as an infrared communication enabling a short distance communication.

A user (a customer in view of the store 35) of the present system caries the portable communication device 32. The user previously deposit money in the financial institute 34. The user dials telephone number of an automatic cash payment system provided by the financial institution 34 which telephone number is previously registered in the portable communication device 32 when the user thinks it is necessary to withdraw money or when the computer 30 of the financial institution recommends to withdraw money by a voice message through the portable telephone system such as a case in which the amount of the digital cash decreases below a predetermined amount. After the call is connected, user inputs a code number and an amount of money to be withdrawn by an inputting operation through numeric/sign keys (for example, the KEY 9 shown in FIG. 3) and visual recognition by a small screen display (for example, the LCD 8 shown in FIG. 3).

After the data is input, the portable communication device 32 enciphers and transmits the input data and client information (a name, an account number, a number of portable communication device). The transmitted data is sent to the computer 30 of the financial institution via the portable telephone carrier company (public telephone network). In the computer 30 of the financial institution, a deciphering and identification of the user are performed, and money is withdrawn from the user's account as digital cash. The computer 30 enciphers the data of the digital cash, and sends the data to the portable communication device of the user via the public telephone network. The data is deciphered by the arithmetic circuit 26 shown in FIG. 3, and is stored in the memory 25 as digital cash. In a case in which the user purchases goods or service, data is exchanged with the store terminal 33 so as to pay for the purchase or service by the digital cash by utilizing a short distance communication (the short distance communication device I/F 27 shown in FIG. 3). At this time, the user receives information indicating the purchased item together with store information from the store terminal 33.

Purchased item information can be used by household account book software installed in a personal computer owned by the user by connecting the portable communication device 32 with the personal computer by the short distance communication function. Additionally, for a person who does not have a personal computer or a person who does not have household account book software, a household account book service can be provided to such a user by a service center (not shown in the figure) by transferring the purchase information to the service center.

Although the household account book service is provided in the conventional system, such service has not been practically used for a reason that a data inputting operation is inconvenient for a user. However, according to the present invention, the purchase information can be automatically input.

Additionally, services to the user such as announcement of time during which particular service is usable by using the function of the portable telephone system by transferring the data from the portable communication device 32 to the store terminal 33 upon permission of the user.

A description will now be given, with reference to the system structure shown in FIG. 5 and flowcharts shown in FIGS. 6 and 7, of an operation of the present system.

FIG. 6 shows a flowchart of an operation for transferring digital money from the financial institution to the portable communication device 32.

When the user desires to obtain the digital cash, the user dials, in step S1, a telephone number designated by the financial institution 34 so as to connect the portable communication device 32 to the computer 30 of the financial institution via the radio base station 31.

After the connection is established, the computer 30 of the financial institution sends, in step S2, an instruction to the portable communication device 32 to perform a confirming operation such as pressing the key "1" in this case when a withdrawal of digital money is to be performed, the instruction being provided by a voice message.

The user hear the voice message, and presses the key "1" for confirmation. When the key "1" is pressed, the portable communication device 32 selects, in step S3, predetermined sets of necessary data (for example, account number and name) from among sets of data stored in the portable communication device 32, and sends the selected data to the computer 3 via the radio base station 31.

In the computer 30 of the financial institute, it is determined, in step S4, whether or not the initially sent data corresponding to the key "1". If the initially sent data does not correspond to the key "1", the routine proceeds to step S5 so as to stop the transaction. If the initially sent data is "1" which indicates confirmation, the computer 30 of the financial institution compares the subsequent data (account number and name) with data stored in the computer 30. Thereafter, the computer 30 sends, in step S6, an instruction by a voice message for requesting input of a code number by pressing keys.

After the user hear the voice message for the request through the portable communication device 32, the user presses, in step S7, keys corresponding to the code number (for example, 4-digit number). Then, the portable communication device 32 enciphers, in step S8, the code number by the MPU, and transmits the resultant data.

The computer 30 of the financial institution deciphers the received data in step S9. Then the computer 30 compares, in step S10, whether the received code number matches the previously registered data. If the code number is different from the previously registered data, the routine returns to step S6 so as to request an input of the code number again. If the code number matches the previously registered data, the routine proceed to step S11 so as to sent a request by a voice message for inputting an amount of money by the pressing keys. After the user hear the voice message for the request trough the portable communication device 32, the user presses, in step S12, keys corresponding to the amount of money to be paid. The amount of money is displayed on the display LCD 8 of the portable communication device 32. Then, the user checks the amount of money, and presses a confirmation key (special sign key). The portable communication device 32 transmits data corresponding to the amount money to the computer 30.

The computer 30 of the financial institution enciphers, in step S13, the digital money data based on the received data and data (key) for permitting storage. The portable communication device 32 deciphers, in step S14, the received data by the MPU 23. Then, it is determined whether or not a correct key for permission of storage is included in the received data. If the correct key is not included, the routine proceeds to step S16 so as to stop the transaction. If the correct key for permission of storage is included in the received data, the digital money is stored, in step S17, in the memory 25.

FIG. 7 shows a flowchart of processes performed by the portable communication device 32 and the store terminal 33 when a payment by the digital money is performed.

In step S21, a store clerk inputs an amount of money to be paid by the user (customer) for the purchase to the store terminal 33, and sends the data to the portable communication device 32 by the short distance communication device I/F 27.

The customer (user) confirms, in step S22, the amount of money to be paid on the small screen display LCD 8. Then, it is determined, in step S23, whether or not the displayed amount of money matches the amount of money to be paid. If the displayed amount of money matches the amount of money to be paid, the user presses a payment key (special key). Then, in step S25, the confirmed amount of money is withdrawn from the digital money stored in the portable communication device 32. Then, in step S26, the portable communication device 32 enciphers the digital money data based on the confirmed amount of data to be paid and data for permission of storage. Then, the portable communication device 32 sends the enciphered data to the store terminal 33 via the short distance communication device I/F 27. If the displayed amount of money does not correspond to the amount of money to be paid in step S23, the user presses an unpayment key (special key) of the portable communication device 32. In the store terminal 33, if the payment key is pressed, the received data is deciphered in step S27. Then it is determined, in step S28, whether or not the received data includes the correct key for permission of storage. If the correct key is not included, the routine proceeds to step S29 so as to stop the transaction. If the correct key is included, the routine proceeds to step S30 so as to store the digital money in a memory of the store terminal 33.

When the customer is one of regular customers, point information is sent from the store terminal 33 to the short distance communication interface, and sends the point information is stored in the portable communication device 32.

A description will now be given of a service system using the portable communication device described in the above-mentioned "1. Portable communication device" which is different from the digital money system.

Figure 8:
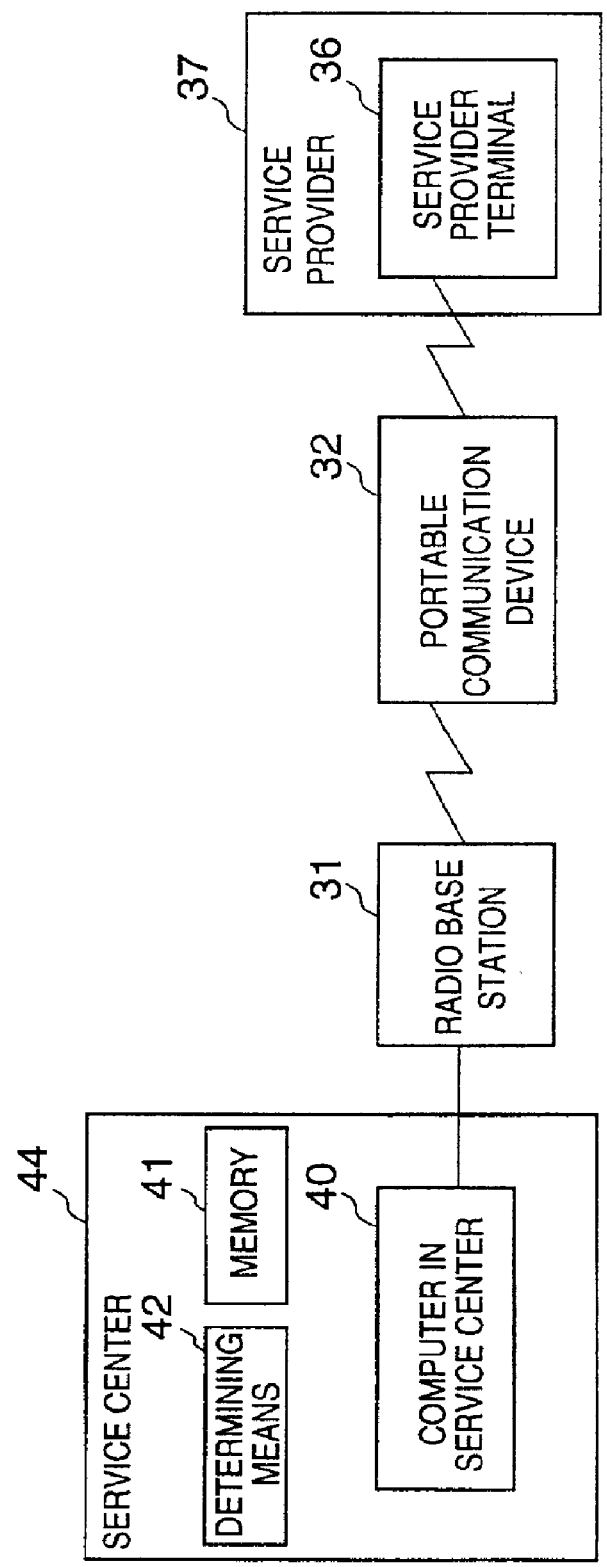
FIG. 8 is a system structure diagram of a service system using the portable communication device.

As shown in FIG. 8, the present system comprises a computer 40 of a service center, the portable communication device 32, the radio base station 31 which can connect portable communication device 32 to the computer 40 and a service provider terminal 36 installed in a service provider 37. The portable communication device 32 and the radio base station 31 are the same as that shown in FIG. 5.

For a new customer of the present system, a determination as to whether or not the new customer should be registered as a regular customer is made by a shop clerk. When a registration is made, necessary data (mane and address) stored in the portable communication device 32 is sent to the service provider terminal 36 via the short distance communication device I/F 27, and the data is stored in the portable communication device 32. Additionally, the regular customer number is sent from the service provider terminal 36 to the portable communication device 32 and stored in the portable communication device 32.

Services via the service center 44 in the system are performed based on the thus-collected customer data.

Figure 9:
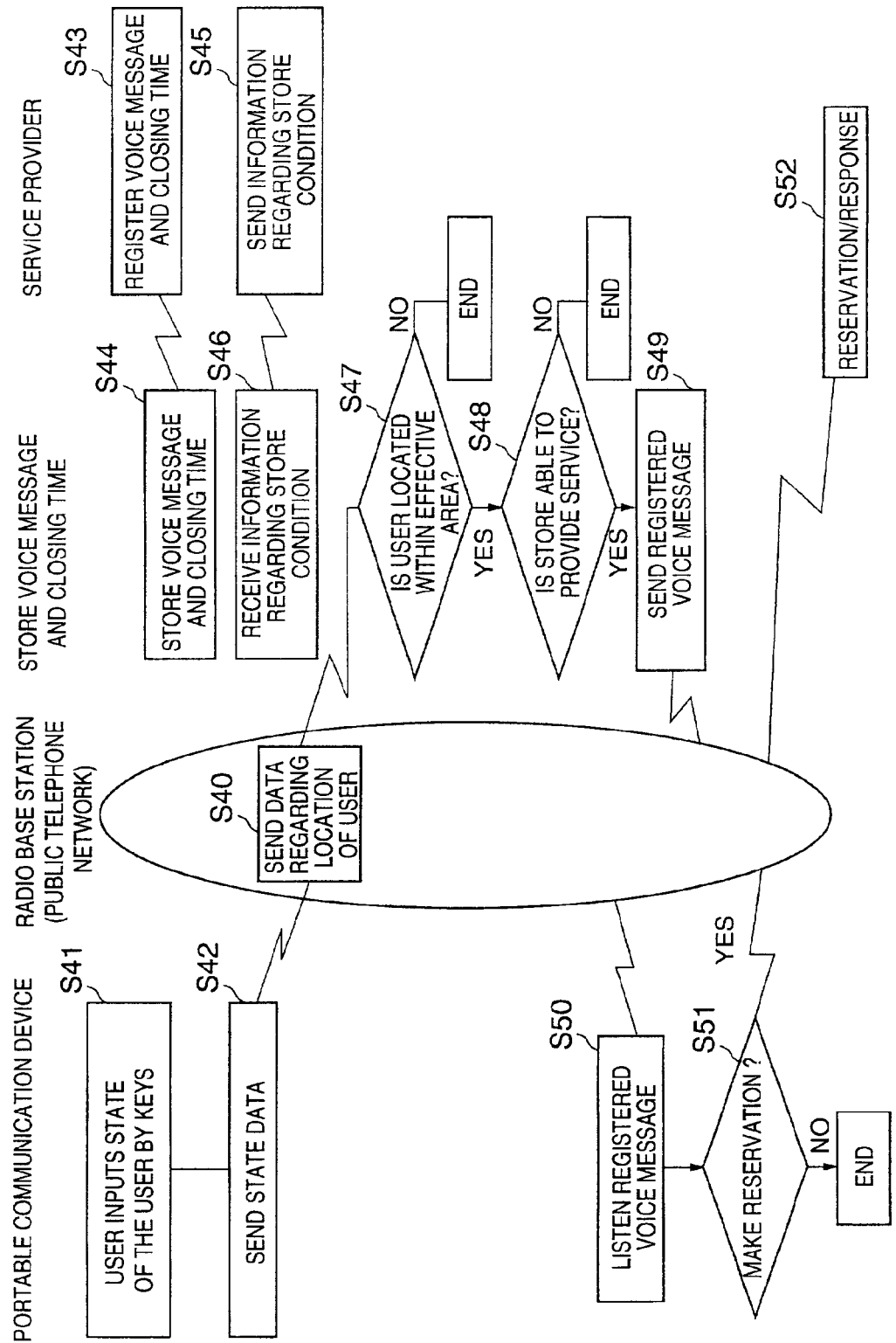
FIG. 9 is a flowchart for explaining the service system using the portable communication device.

FIG. 9 shows a flowchart of the service system.

In this service system, a telephone number of the portable communication device (portable telephone) of each user is previously registered in the service provider terminal 36 as information regarding regular customers. Additionally, a telephone number of the service center 44 and a protocol (procedure for receiving a service) are stored in the portable communication device 32 of the user.

Thereafter, the a shop clerk of the service provider 37 registers, in step S44, a message to the regular customer and information regarding opening and closing time of the store in the service center 44. Additionally, in step S45, the shop clerk announces a change in the shop condition such as a degree of congestion to the service center 44. The user inputs, in step S41, through the keys a condition of the user (for example, the user want to have a meal: 6, the user has a spare time: 7) by pressing assigned keys (in this case, the keys "6" or "7" is pressed). Then the portable communication device 32 sends, in step S42, the input data to the service center 40.

The radio base station 31 receiving the data sends, in step S40, the received data to the service center 44 by adding positional information regarding location of the portable communication device 32. It should be noted that position registration information in the mobile communication is used as the positional information of the portable communication device 32. Such positional information is obtained by exchange of signals between the radio base station 31 and the portable communication device 32.

In the service center 44, it is determined, in step S47, whether or not the user is in a communicable area according to the positional information of the portable communication device 32. Then it is determined, in step S48, whether or not the registered service provider can provide services. If the service can be provided by the present store, the service center 44 sends a registered voice message to the portable communication device 32.

The user hears, in step S50, the registered voice message from the portable communication device 32 and determines, in step S51, whether or not the user receives the service. If the user wants to receive the service, the user presses a specific key so as to connect the portable communication device 32 to a telephone automatic reservation system of the service provider, and make reservation.

A description will now be given, with reference to FIGS. 10, 11 and 12, of another service using the service system shown in FIG. 9. This service system provides services matching preference of the owner (user) of the portable communication device 32. The structure of the system is the same as the system shown in FIG. 8 except for the portable communication device 32 shown in FIG. 10 being used.

The service system shown in FIG. 8 comprises a service provider terminal 36 installed in the service provider 37, a service center 44, a radio base station 31 connected to the service center 44 and the portable communication device 32. The service center 44 includes service information storing means (memory) 41 and determining means 42. The service information storing means 41 is provided for storing information regarding kinds of services which can be provided by the service provider 37, availability of services provided by the service provider and message to the user. The determining means 42 is provided for determining whether or not the services can be provided to the user based on the present condition of the user. The portable communication device 32 includes remote communication means (corresponding to the remote communication I/F 2 shown in FIG. 3) which enables communications with the radio base station 31 and inputting means for inputting a present condition of the user.

Figures 10, 11:
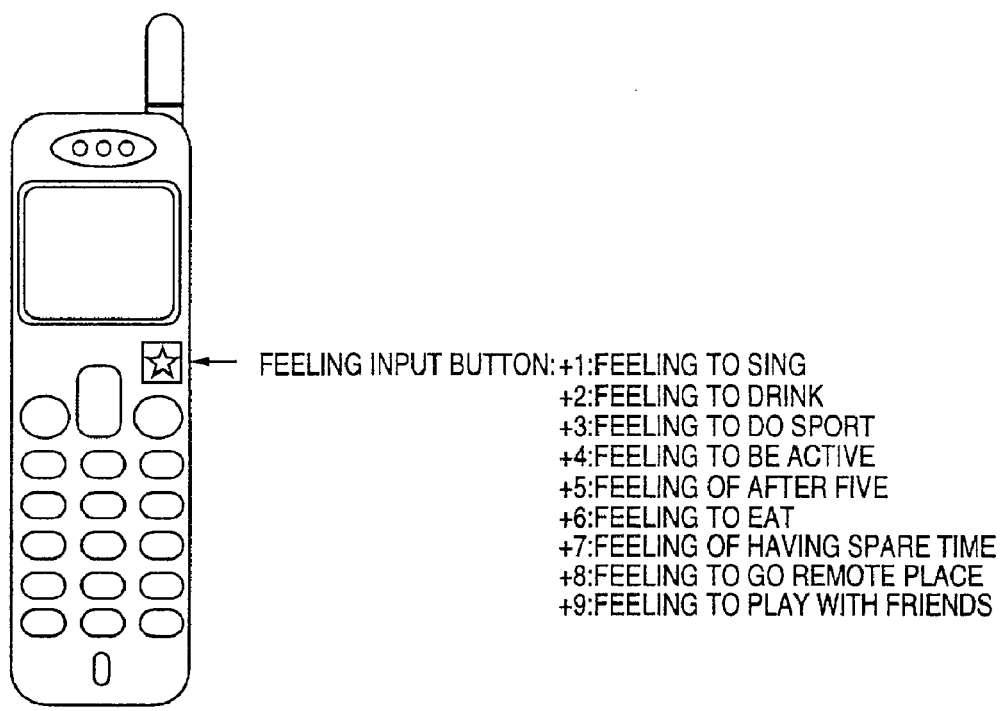
FIG. 10 is a plan view of a portable communication device having a feeling input button.
FIG. 11 is an illustration for explaining a display of characters on the portable communication device.

The portable communication device 32 is provided with a "feeling input button" as the inputting means for inputting a present condition of the user for inputting a present state of feeling of the user as shown in FIG. 10. If the user has a feeling to sing a song, the user presses the key "1" subsequent to the "feeling input button".

When the present condition of feeling of the user is input by the user pressing the "feeling input button" and one of the numerical keys, the portable communication device 32 automatically transmits the information regarding the present state of feeling of the user to the service center 44 through the remote communication means via the radio base station 31.

Upon receipt of the information regarding the present state of feeling of the user, the service center 44 determines whether or not service which can be provided to the user is present by using the determining means 42. If there is service which can be provided to the user, message to the user stored n the service information storing means 41 is sent to the portable communication device 32. For example, for a user who wants to sing a song, information regarding the closest karaoke place is provided to the user by a voice message. Additionally, such information may be displayed on the small screen display if necessary. If plurality of services can be provided to the user, each of the services is announced to the user with an order.

FIG. 12 shows a flowchart of an operation using the feeling input button.

First, the user presses, in step S60, the feeling input button. Then, in step S61, information is displayed on the small screen display of the portable communication device 32 as shown in FIG. 11. It is determined, in step S 63, whether or not there is an item which represents the present state of feeling of the user. If there is the item which represents the present state of feeling of the user, the user pressed, in step S64, a numeric key corresponding to the present state of feeling. On the other hand, if there is no item which represent the present state of feeling of the user, the routine proceeds to step S62 in which the user scrolls the displayed items.

When the present state of feeling of the user is input in step S64, the portable communication device 32 calls the previously registered server (service center 44) by the remote communication means so as to transfer the data regarding the feeling of the user to the service center 44. Then, in step S66, the service center 44 sends to the user the information regarding stores which can provide service to the user by using the determining means 42 from the conditions of the stores and the positional information of the portable communication device 32 by adding a order to the stores. Thereafter, in step S67, the user selects one of the stores provided in the received information and make a reservation.

A description will now be given, with reference to FIG. 13, of an outline of the system of the portable communication device having the feeling input button in view of data and a server. The system shown in FIG. 13 comprises a service server 50 (corresponding to the computer 40 of the service center shown in FIG. 8) 50, a store CTI (computer telephone integration) 51, the portable communication terminal 52 which is the portable communication device having the feeling input button, a personal computer (PC) 53, a digital TV 54 and a store settling machine 55 (corresponding to the service provider terminal 36 shown in FIG. 8).

Figure 14A:
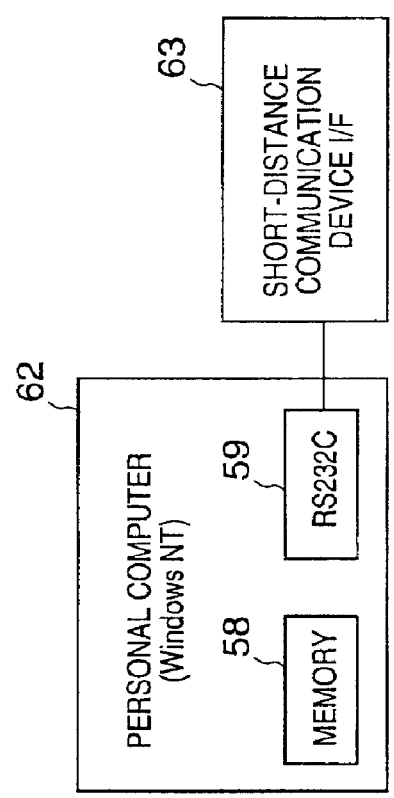
FIG. 14A is a block diagram of an example of the store terminal.
Figure 14B:
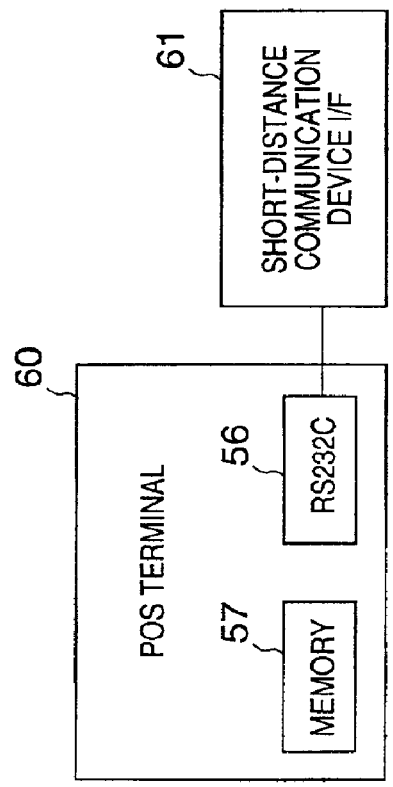
FIG. 14B is a block diagram of another example of the store terminal.

FIGS. 14A and 14B show examples of the store settling machine 55. In FIG. 14A, the store settling machine 55 comprises a POS terminal 60 and a short distance communication device I/F 61. The POS terminal 60 comprises a memory 57 and an RS232C interface 56 connected to the short distance communication device I/F 61. In FIG. 14B, the store settling machine 55 comprises a personal computer 62 and a short distance communication device I/F 63. The personal computer 62 comprises a memory 58 and an RS232C Interface 59 connected to the short distance communication device I/F 63.

Figure 15:
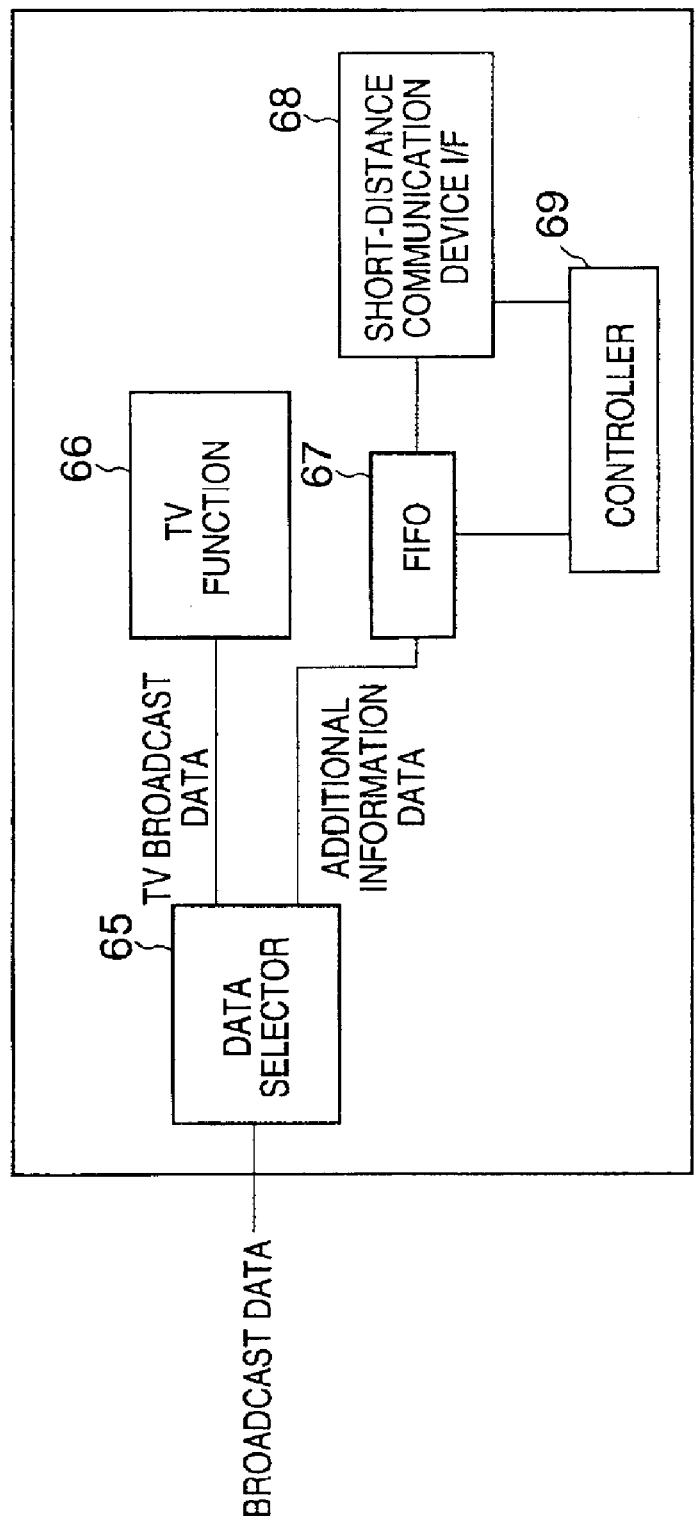
FIG. 15 is a block diagram of a digital TV.

FIG. 15 is a block diagram of the digital TV 64. The digital TV 64 comprises a data selector 65, a TV function part 66, a FIFO (first-in first-out) 67, a short distance communication device I/F 68 and a controller 69.

In the digital TV 64, TV broadcast data and additional information are separated from broadcast data. The TV broadcast data is visualized by the TV function part 66. The additional information is transmitted to an external device such as a personal computer via the short distance communication device I/F 68 and the controller 69.

The service server 50 corresponds to the computer 40 of the service center shown in FIG. 8, and is connected to the store CTI 51. The portable communication terminal 52 having the feeling input button corresponds to the portable communication device 32 shown in FIG. 8, and is connected to the PC 53, the digital TV 54 and the store settling machine 55 via short distance communications. The portable communication terminal 52 includes a registered data storing area 63, a personal attribute storing area 64 and a service information storing area 65. The registered data storing area 63 can obtain information such as Web information from the PC 53 and the digital TV 54.

The service server 50 includes a store condition database 60 and a personal database 61. The store condition data base 60 stores information regarding each store (service provider), and the personal database 61 stores information regarding each user who is an owner of the portable communication device. The information regarding each store is input to the store condition database 60 from the store CTI 51. The information regarding each user is input to the personal database 61 from the portable communication terminal 52.

The service server 50 is connected to each of the portable communication terminal 52 and the store CTI 51 via remote communications. The store data is transmitted from the service server 50 to the portable communication terminal 52, and the feeling data is transmitted from the portable communication terminal 52 to the service server 50. Additionally, registered data is input from the registered data storing area 63 of the portable communication terminal 52 to the personal database 61 of the service server 50.

Additionally, reservation data is transmitted from the portable communication terminal 52 to the store CTI 51, and the registered data, voice signal guidance information and ticket data are transmitted from the CTI 51 to the portable communication terminal 52.

In FIG. 13, the registered data is temporarily stored in the portable communication terminal 52, and is transferred to and stored in the service server 50. The personal attribute information is stored in the portable communication terminal 52. The ticket data is stored in the portable communication terminal 52 as time limited service information.

As a result, the user is not required to manage the personal database, and data input of the personal database can be performed by a single operation of a button on the portable communication terminal 52.

Additionally, the following methods can be used for registering the store information.

1. A method in which a customer is registered as a regular customer when the customer visits a store.

2. A method in which additional electronic information such as programs of the WebTV 54 is stored in the portable communication terminal 52 via the short distance communications, and, thereafter, registered in the service server 50.

3. A method in which electronic information is obtained from the Web of the PC 53 and stored in the portable communication terminal 52, and thereafter, registered in the service server 50.

4. A method in which the Web page indicated in a magazine is referred to be the PC 53, and registered by the method described in the above-mentioned item 3.

5. A method in which electronic information is stored in the portable communication terminal by calling a telephone number recited in a magazine, and, thereafter, registered in the service server 50.

6. A method in which the store information is obtained from a friend.

7. A method in which registration is made by using chain store information of the registered store.

8. A method in which registration is made by using related store information of the registered store.

A description will now be given, as an example of a time limited service, a service when a public transportation is used by purchasing a ticket.

When a ticket is purchased through the portable communication device 32, data regarding the purchased ticket is stored in the memory 41 of the service center 44. In this service, a computer system of the public transportation may perform an application program of this service. The data regarding the ticket includes information regarding a station where the user gets off and an arrival time. An announcement is provided to the user before the user reaches the destination by using the data regarding the ticket.

The service center 44 stores the voice data for announcing the station or the bus stop where the user gets off in the memory 41. The service center also includes means for setting and canceling a temporary telephone number corresponding to the purchased ticket, determining means 42 for determining a time slightly before the train or the bus arrives at the destination and means for sending the result of the determination via the radio base station 31 so at to provide an announcement slightly before the arrival to the destination.

The service center 44 assigns the same temporary telephone number to users using the same train and getting off at the same station so as to announce to the users that the station where the users get off is approaching slightly before the arrival to the destination by a voice message.

Additionally, the service center 44 transmits data representing an arrival. The portable communication device 32 notifies the user of a reception of the data by means of buzzer. Alternatively, voice data may be reproduced when the user presses a speak button, the voice data being previously stored in a memory.

By providing the same temporary telephone number to users receiving the same service, the radio base station is required to perform the transmission of data only once.

The household account book service is one of other services. In the household account book service, when payment is made by digital money through the portable communication device 32, data regarding contents of the payment, which data is substituted for a receipt, is stored in a memory (for example, the memory 25 shown in FIG. 3) of the portable communication device 32. The storage of the data can be accumulated for a predetermined number of times. The user makes a call to the service center 44 so as to transmit the data regarding contents of payment with a user ID when the data is accumulated or the user wants to receive the household account book service. If the user wants to receive only the household account book service, the user may make a call to the computer 30 of the financial institution.

In the service center 44 is able to keep a household account book by inputting the data to the household account book producing application. The produced household account book may be printed out and sent to the user. Alternatively, the produced household account book may be displayed on a TV set by providing a set top box to the TV set which set top box enables to display a static image and is connectable to the portable communication device 32 so that data regarding a static image of the produced household account book is transmitted to the set top box via the portable communication device 32. Additionally, the household account book can be seen on a computer by inputting the data to the computer from the portable communication device 32, which computer is connectable to the portable communication device 32 and provided with the household account book software. In such a case, an inputting operation of the data regarding contents of payment is simplified.

As described above, by using the present digital money system, a user can withdraw money at any place without visiting a financial institution as long as the user is in an area where the user is in a communicable area of the portable telephone. Additionally, an ATM/CD machine on the side of the financial institution is not needed, that is, only the computer to which the ATM/CD machine is connected is needed. Accordingly, whenever the system is in operation, a user can withdraw money. Further, an inputting operation to the household account book software can be performed by a one-time operation.

Additionally, the user is not required to carry both the portable telephone and a purse or an electronic card. Since the portable communication system according to the present invention has a purse function, the portable communication device has an individual identification function. Accordingly, communication service to an individual can be simplified and customized.

Further, payment for information/communication can be made instantaneously, over use exceeding the capacity of payment can be prevented.

In the system used with a public transportation, a service for announcing a place at which a user gets off can be provided.

Additionally, according to the system shown in FIG. 8, a user can receive a preferred service in response to a condition of the user (for example, a feeling of the user).

3. Attachment for the Portable Communication Terminal

The attachment for the portable telephone (portable communication terminal) according to the present invention is extremely effective in the information communication service system which can be used by any one at any time and any place. The attachment for the portable telephone is provided for using a portable telephone, which has already become popular, as such a portable communication device.

Additionally, the attachment for the portable telephone according to the present invention is tightly connected to the portable telephone without loosing integrity so as to use together with the portable telephone. That is, the attachment according to the present invention can be operatively connected to various inputting and outputting means of the portable telephone such as image display means or voice inputting and outputting means so that various application programs can be executed.

The attachment is used as an attachment for a mobile telephone so as to use with human I/F functions of the mobile telephone such as a display (LCD), input keys (KEY) or a speaker (receiver) so as to (5) improve portability, (7) improve a human interface and (8) provide a low cost portable communication device.

Specifically, the attachment according to the present invention has a male connector which is connectable to a data communication connector of a portable telephone so that each inputting and outputting means of the portable telephone can be controlled by electric signals.

If a short distance digital data communication is necessary so as to perform payment by digital cash, a communication means without charge is used as such a short distance communication.

Figure 16:
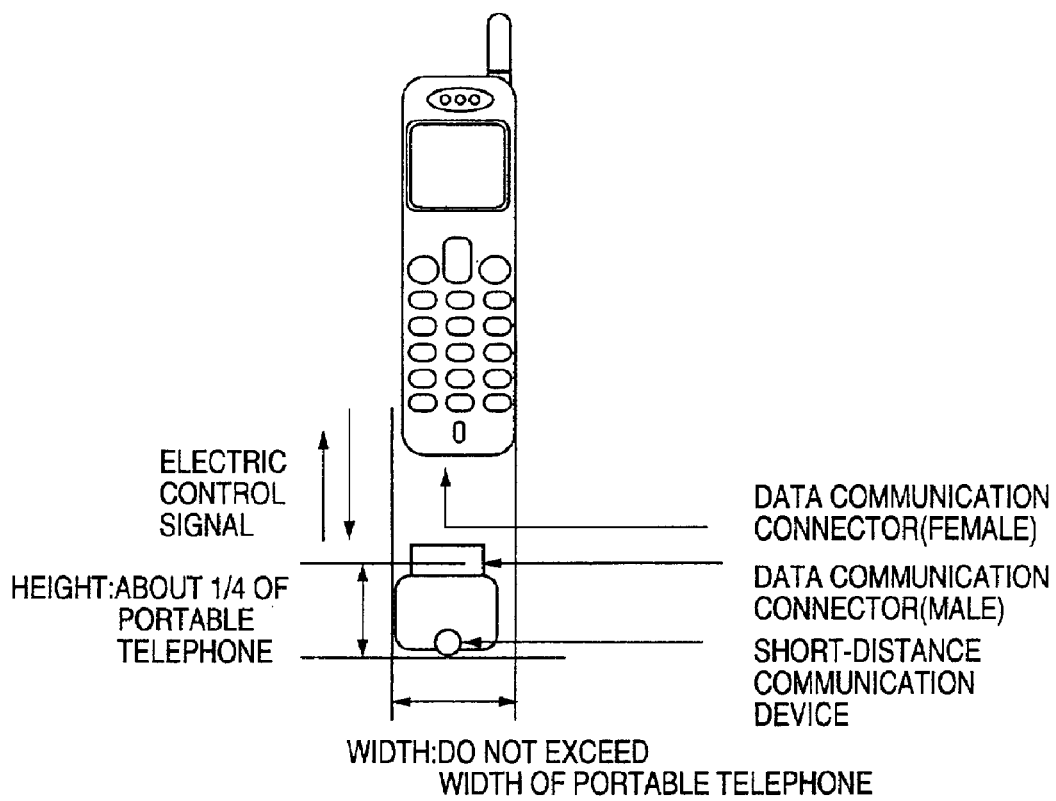
FIG. 16 is an illustration for explaining an appearance of an attachment according to the present invention.
Figure 17:
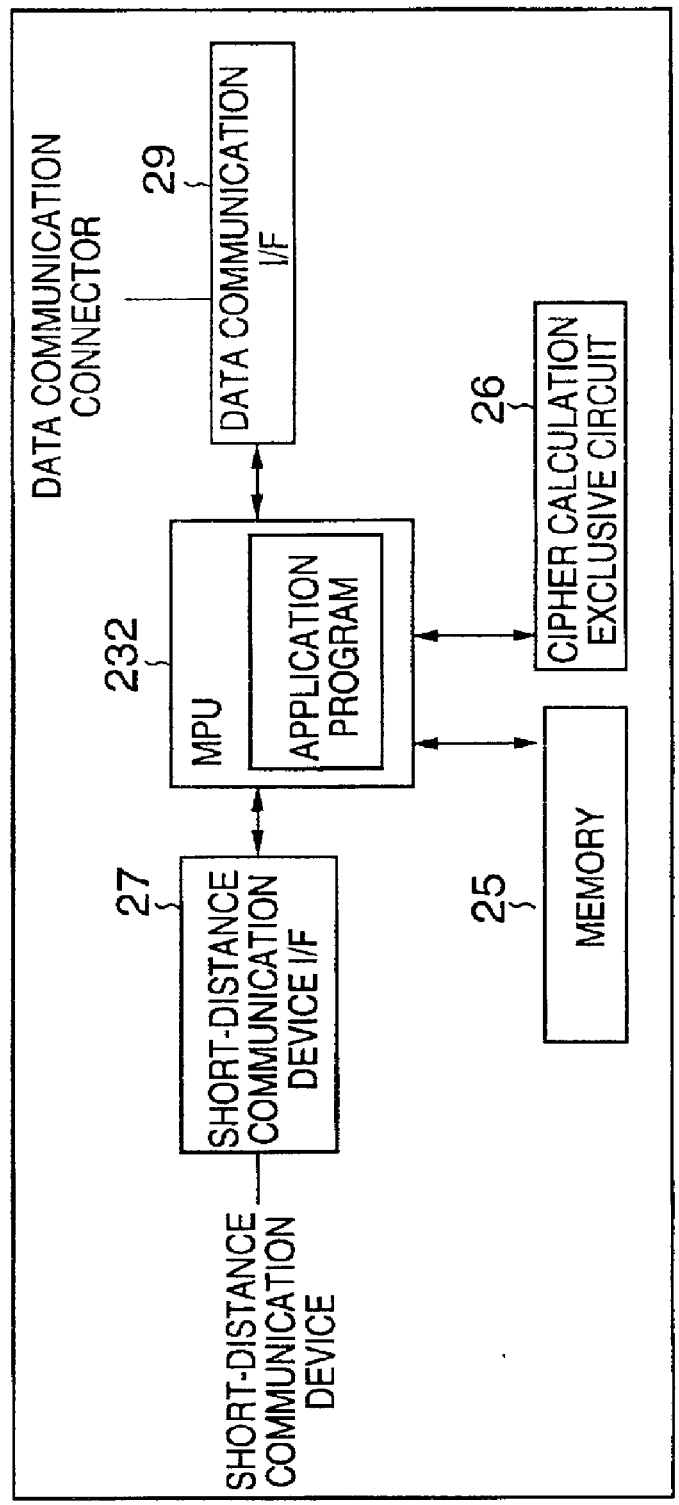
FIG. 17 is a block diagram of the attachment according to the present invention.

Accordingly, a short distance communication I/F is added to the attachment. Additionally, in order to handle digital cash or personal data, the data must be enciphered or deciphered. Accordingly, an enciphering and deciphering circuit is added to the attachment. Since the attachment must be designed so as to be integrated with a portable telephone with respect to its volume and weight without loosing an appearance of the portable telephone, the attachment must have a cubic shape as shown in FIG. 16. FIG. 17 shows a structure of the attachment which satisfies the above-mentioned requirements.

The attachment 101 shown in FIG. 17 comprises an MPU 232 which can execute programs, a memory 25, a short distance communication device I/F 27, an arithmetic circuit for enciphering and a data communication I/F 29. An operating system is installed in the MPU 232 so as to control peripheral devices and execute application programs provided for the attachment 101. Generally, the MPU 232 uses the memory 25.

The memory 25 stores information regarding each user such as a name, an address, an amount of digital cash, digital data of a ticket. The information stored in the memory 25 is read and processed by the MPU 232, and is output to an external device. The memory 25 also stores application programs for providing various services.

The arithmetic circuit 26 for enciphering is used for enciphering and deciphering data to be handled when high-level security is required for the data such as application program data regarding digital money or a point card. The data stored in the memory 25 is enciphered if necessary.

The short distance communication device I/F 27 is provided for exchanging data with a device located in the vicinity of the portable communication device with the attachment. In this embodiment, an infrared device such as an IrDA is used for the short distance communication device I/F 27.

The data communication I/F 29 is provided for communication with a portable telephone 100.

Figure 18:
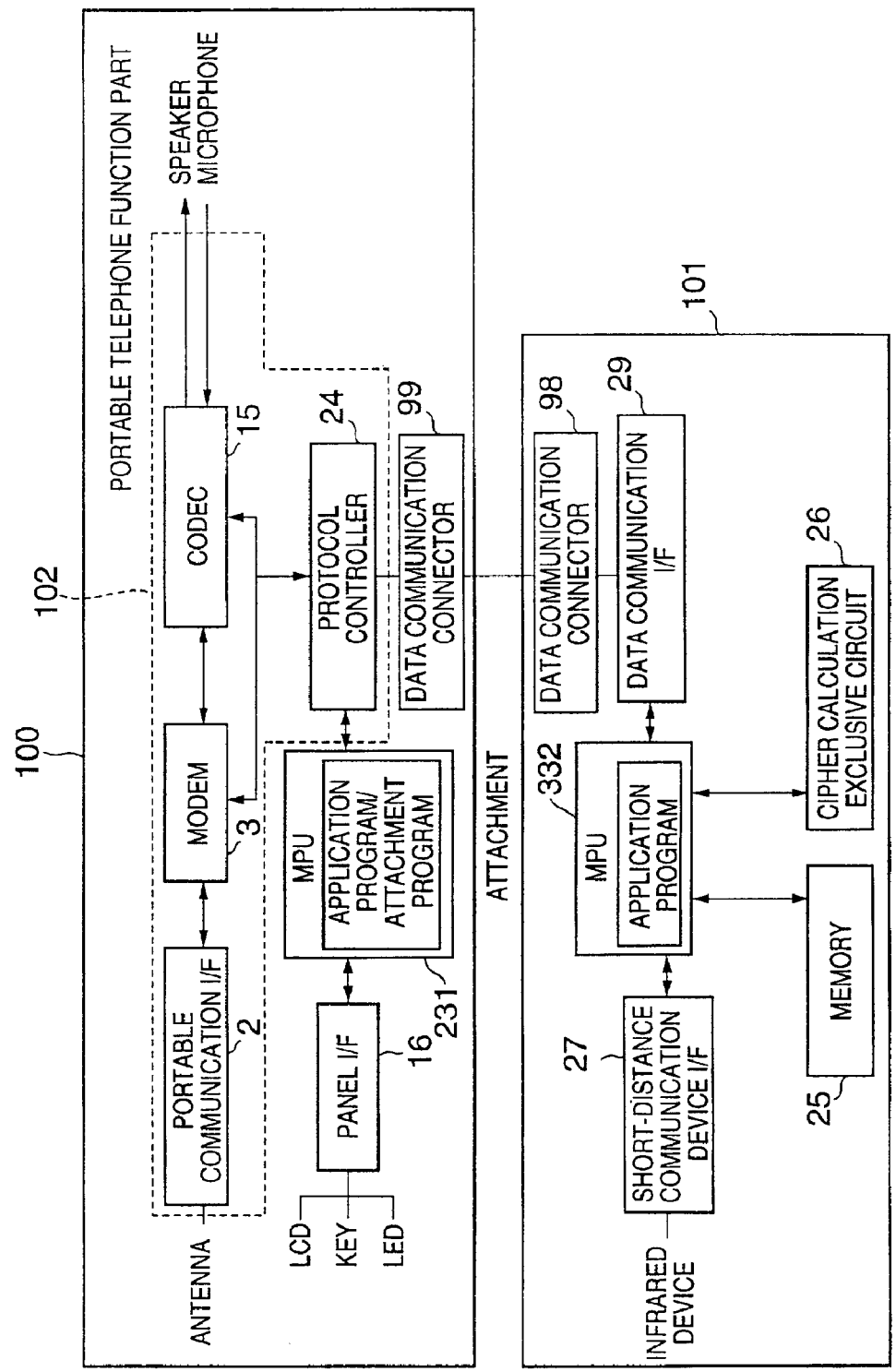
FIG. 18 is a block diagram of a portable telephone and the attachment shown in FIG. 17.

FIG. 18 is block diagram of the portable telephone provided with the attachment 101. The portable telephone 100 shown in the upper portion of FIG. 18 comprises a portable communication I/F 2, a modem 3, a codec 15, a protocol controller 24, an MPU 231, a panel I/F 16, a microphone, a speaker, an antenna, an LCD, an LED and keys (KEY).

Figure 1:
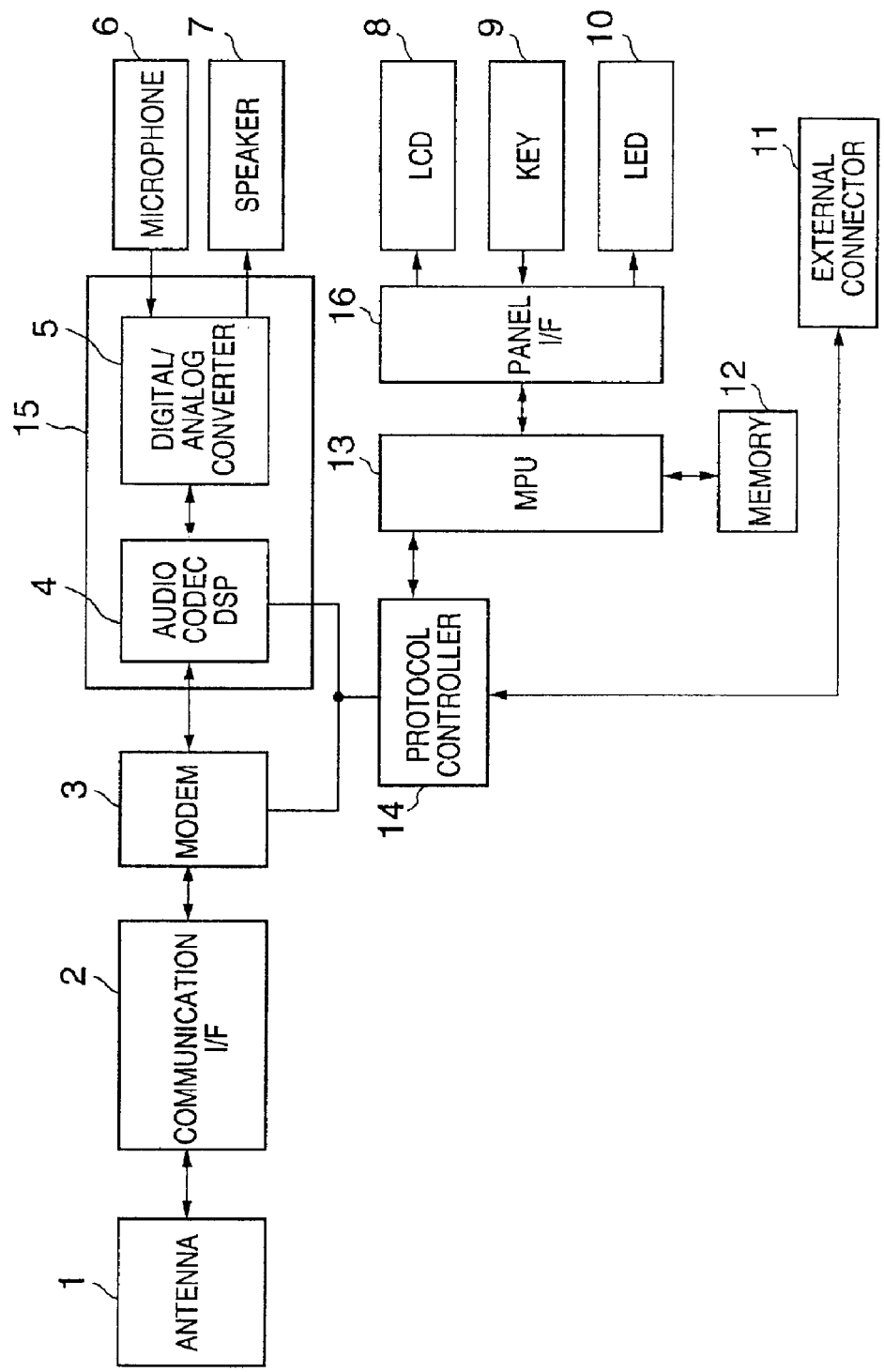
FIG. 1 is a block diagram of a conventional PHS handset.

In FIG. 18, parts that are the same as the parts shown in FIG. 1 are given the same reference numerals, and descriptions thereof will be omitted.

The protocol controller 24 determines a data path. For example, the protocol controller 24 determines a data path to send data received by the antenna to an external device via a data communication connector 99 or output to a speaker via the codec 15. An instruction output from the MPU 232 of the attachment 101 is sent to the protocol controller 24 of the portable telephone 100 via a data communication connector 98. The protocol controller 24 analyses the instruction, and determines which inputting and outputting means is to be controlled.

The MPU 231 of the portable telephone 100 executes application programs such as control programs of a portable telephone or an address book.

When the data communication connector 98 of the attachment 101 is connected to the data communication connector 99 of the portable telephone 100, programs being executed in the portable telephone 100 is changed from portable telephone programs to programs for attachment in accordance with a plug & display function.

According to the programs for attachment, commands sent from the MPU 232 of the attachment 101 are executed, which commands are determined by the protocol controller 24 to be commands for an output means for the LCD, the LED or the reception tone speaker.

Additionally, according to the programs for attachment, a command determined to be a control command for the outputting means of the speaker is enabled to be output from the speaker. A digital signal input by the microphone of the portable telephone 100 is rendered to be transmissible to the attachment 101. Data received by the portable telephone 100 is also rendered to be transmissible to the attachment 101.

Figure 19A:
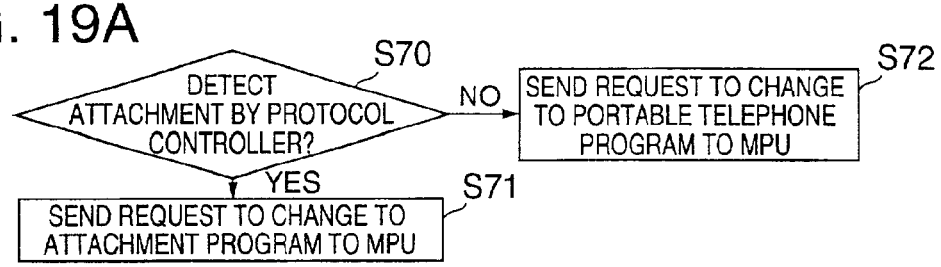
FIGS. 19A, 19B and 19C are flowcharts for explaining controlling operations of inputting and outputting units provided in the portable telephone.
Figure 19B:
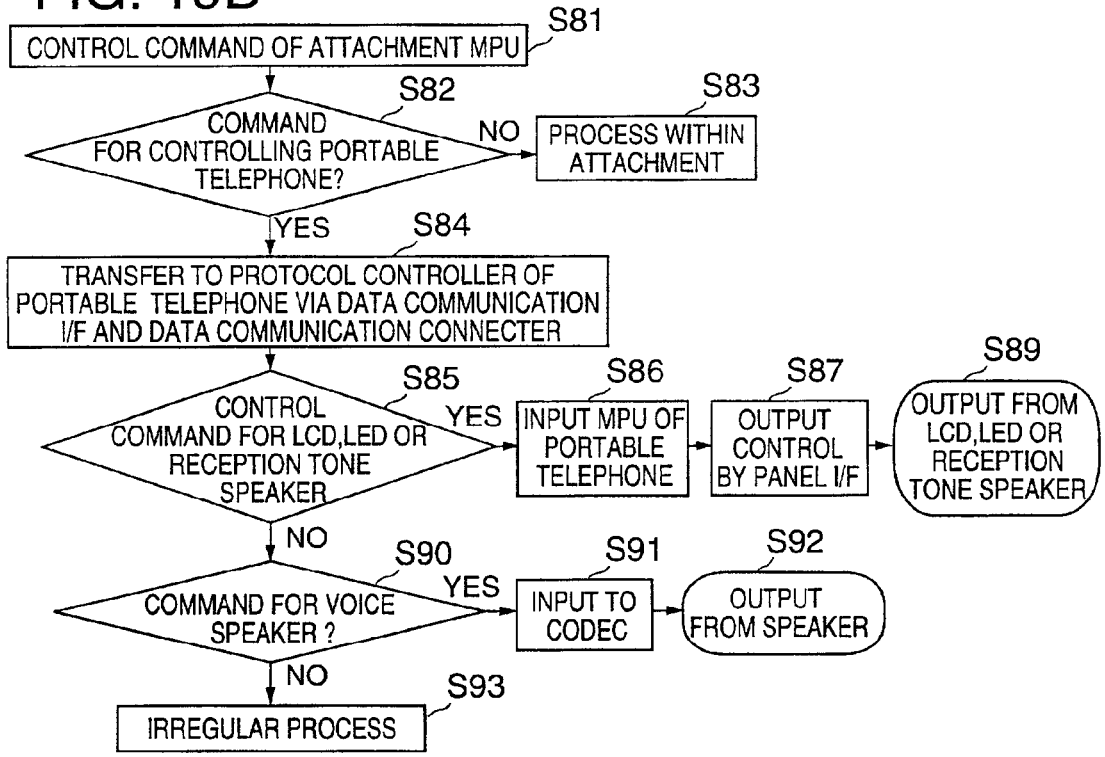
Figure 19C:
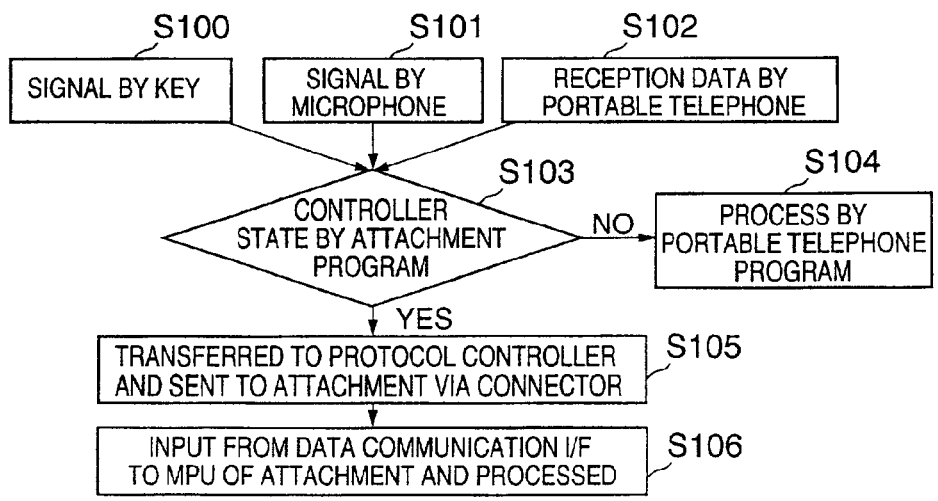

FIGS. 19A, 19B and 19C are flowcharts of operations for controlling each inputting and outputting means of the portable telephone 100.

In FIG. 19A, it is determined, in step S70, whether or not a connection of the attachment 101 is detected by the protocol controller 24. If it is determined that the protocol controller 24 detects a connection of the attachment 101, a request is sent, in step S71, to the MPU 231 of the portable telephone 100 to change programs to the programs for attachment 100. On the other hand, if a connection of the attachment 101 is not detected by the protocol controller 24, the routine proceeds to step S72 so as to send a request to change the programs stored in the MPU 231 to the portable telephone programs. It should be noted that in the protocol controller 24, programs are sequentially executed.

In FIG. 19B, when a control command is sent, in step S81, from the MPU 232 of the attachment 101, it is determined, in step S82, whether or not the control command is a command for controlling the portable telephone 100. If the control command is not a command for controlling the portable telephone 100, the control command is processed by the attachment 100 in step S83. On the other hand, if the control command is a command for controlling the portable telephone 100, the control command is transferred, in step S84, to the controller 24 via the data communication connector 98. The process of steps S81 to S84 is performed by the MPU 232 of the attachment 101.

Upon receipt of the control command from the MPU 232 of the attachment 101, it is determined, in step S85, whether or not the control command is for the LCD, the LED or the speaker for a reception tone. If it is determined that the control command is for the LCD, the LED or the reception tone speaker, the control command is transferred, in step S86, to the MPU 231 of the portable telephone 100. Then, in step S87, the LCD, the LED or the speaker is controlled by the panel I/F 16.

If the control command is not a command for controlling the LCD, the LED or the reception tone speaker, it is determined, in step S90, whether or not the control command is for the voice speaker. If the control command is for the voice speaker, the control command is input, in step S91, to the codec 15. Accordingly, the voice speaker is controlled according to the control command. If the control command is not for the voice speaker, an irregular process is performed in step 93, and the routine is ended.

In FIG. 19C, when a KEY input is made in step S100 or when a microphone input is made in step S101 or when data is received through the portable communication in step S102, the MPU 231 of the portable telephone 100 determines, in step S103, whether or not a state controlled by the programs for attachment is established. If the state controlled by the programs for attachment is not established, the input data is processed, in step S104, in accordance with the portable telephone program, and the routine is ended. If the state controlled by the programs for attachment is established, the input data is transmitted, in step S105, to the MPU 232 of the attachment 101 via the protocol controller 24, the data communication connector 99 and the data communication connector 98. Then, in step S106, the MPU 232 of the attachment 101 receives and processes the input data.

It should be noted that the MPU 231 of the portable telephone 100 and the MPU 232 of the attachment 101 provide a display by using the LCD when the KEY input is made or when the microphone input is made or data is input through the portable communication. Additionally, the MPU 231 of the portable telephone 100 and the MPU 232 of the attachment 101 provide a display by using the LCD when the each of the MPU 231 of the portable telephone 100 and the MPU 232 of the attachment 101 outputs a control command.

A description will now be given, with reference to FIGS. 20 and 21, an example case in which the portable telephone connected to the attachment 101 is usable as a service terminal by an application program installed in the attachment 101 in relation to a service of digital money and a point card.

By installing the application program for the service of digital money and a point card in the MPU 232 of the attachment 101, data requiring a high-level security can be handled since the arithmetic circuit 26 for encoding calculation is provided. Additionally, an infrared device according to the IrDA can be used as exchanging means for an electronic media by provision of the short distance communication device I/F 27.

Figure 21:
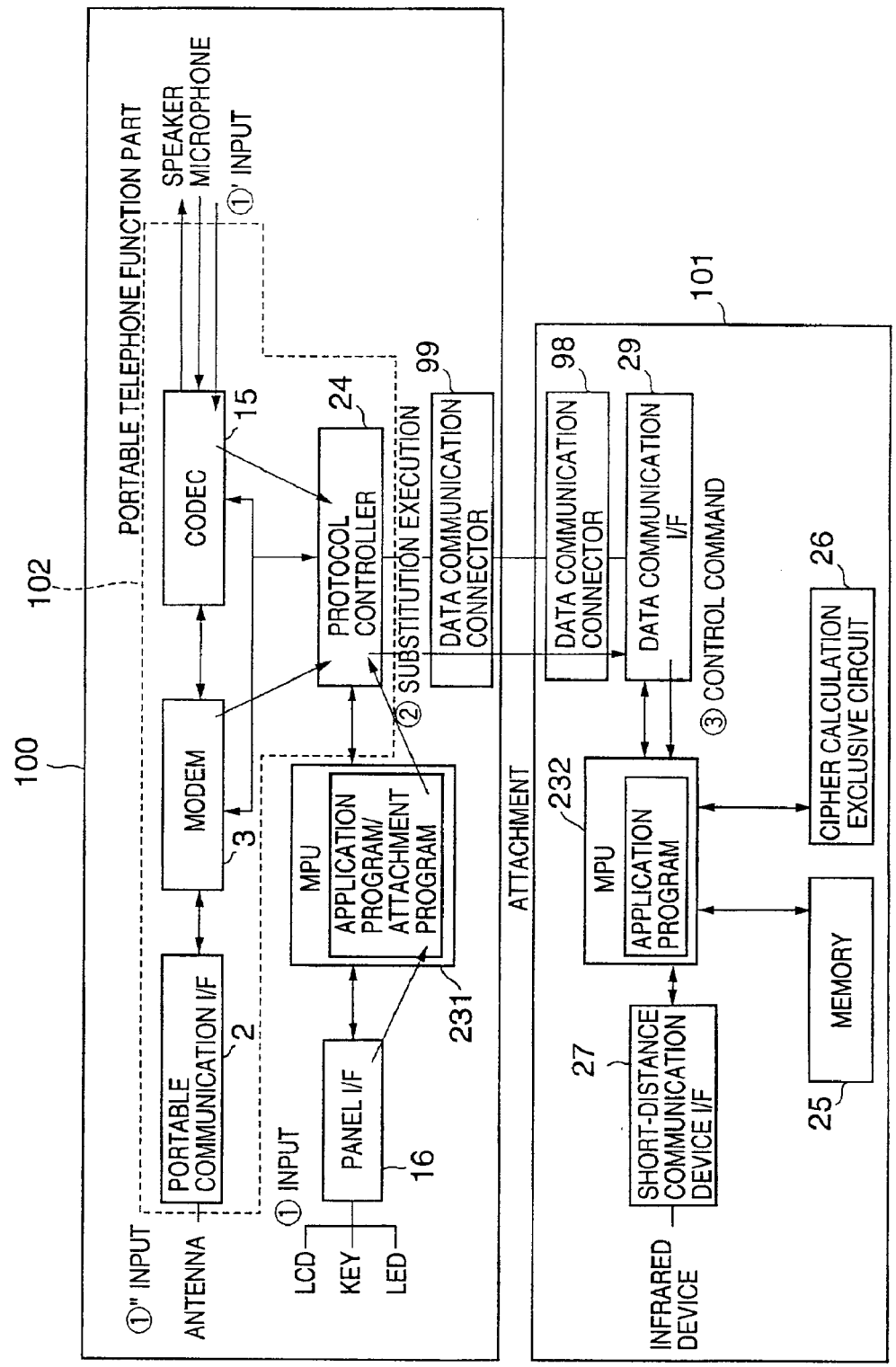
FIG. 21 is an illustration for explaining a control path from the portable telephone to the attachment.

Supply of digital money is performed by the MPU 232 and the memory 25 of the attachment 101 through a path routing the antenna→the portable communication I/F 102→modem 3→the protocol controller 24→the data communication I/F 29→the MPU 232 as shown in FIG. 21. Additionally, a certification algorithm required for the supply of digital money or payment or transfer by digital money can be performed at a high speed by using the arithmetic circuit for enciphering calculation.

Since personal information of a user is stored in the memory 25 of the MPU 232 of the attachment 101, the user can complete a registration procedure by transferring the personal information to a store terminal by an infrared communication using the short distance communication device I/F.

When the personal information is transferred, the personal information is enciphered by the arithmetic circuit 26 for enciphering calculation using an open cipher key previously received from the store side, and thereby, the enciphered personal information cannot be deciphered, which maintains a security, even if the communication of the personal information is tapped.

In such an application, settling state of a balance of digital money and a history of purchase or detail of personal information being transferred can be checked by using inputting and outputting means of the portable telephone such as the LCD or a voice sound output by the speaker.

Figure 20:
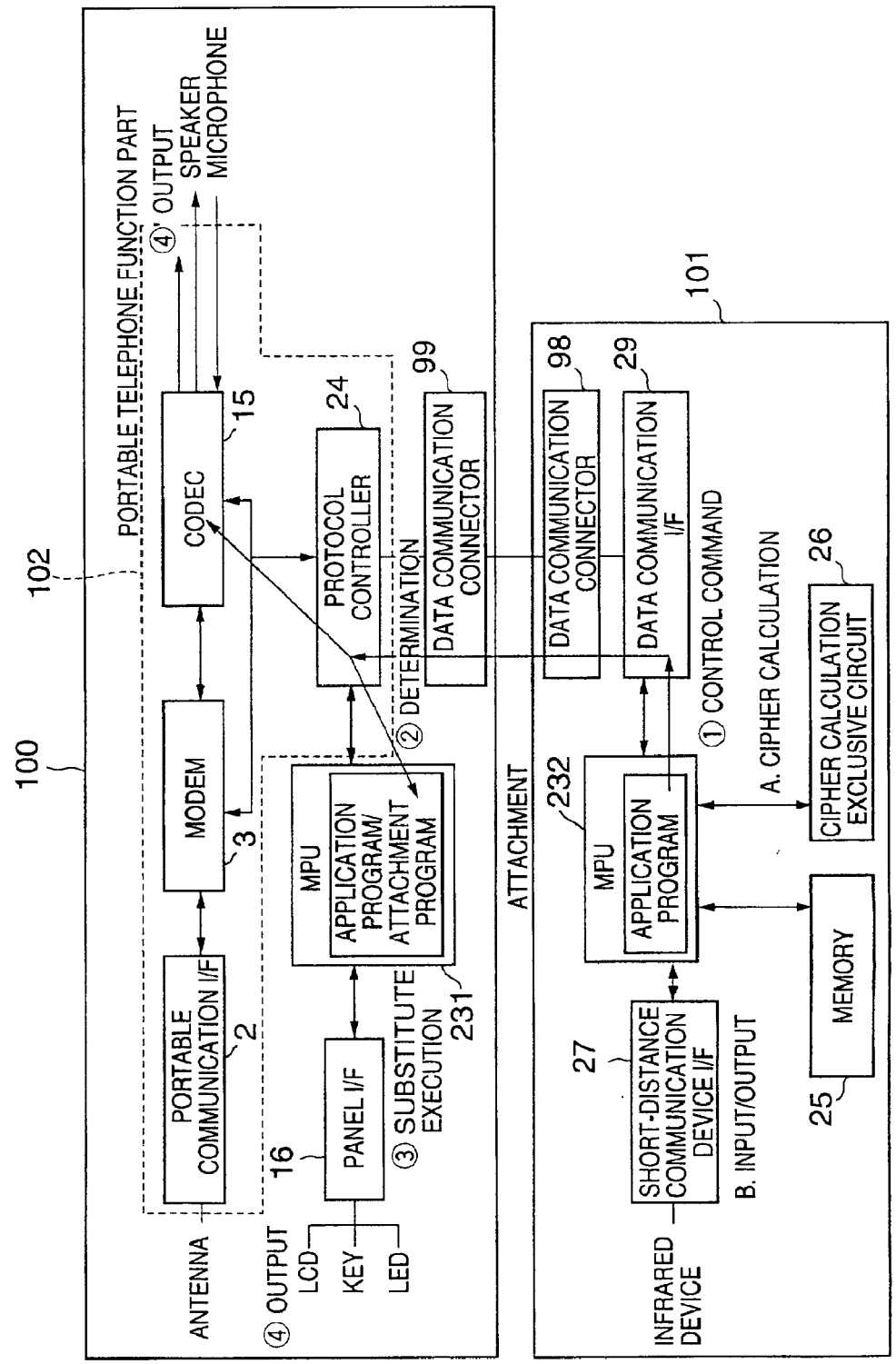
FIG. 20 is an illustration for explaining a control path from the attachment to the portable telephone.

For example, when the personal information is transferred to the store terminal, a display can be made on the LCD of the portable telephone or a voice sound of the portable telephone by using a path ①→②→③→④ as shown in FIG. 20. If the user does not wish to transfer the personal information upon checking, the user can select items which the user does not wish to transfer by using a path ①→②→③ shown in FIG. 20 by inputting instruction by pressing the keys. Thereby, the personal information from which the information which the user does not wish to transfer is excluded can be transferred to the store terminal by the short distance communication device I/F 27.

Additionally, a point service can be received by a single attachment 101 which point service conventionally differs from store to store, from chain to chain or from industry to industry. In order to avoid such an inconvenience, some examples use a magnetic IC card. However, contents of the magnetic IC card must be checked at a predetermined site.

In the attachment 101, an electronically provided item such as a point is managed by classifying by each kind of service by using the inputting and outputting function of the portable telephone 100. Thereby, a user is advised that the termination of acquired points is approaching, or a process for achieving a point award can be visually provided to the user in cooperation with application software.

The user can receive an award when accumulated points reach a predetermined level. The user can request such an award via the portable telephone and receive a service for the request for the award. By utilizing such a function, a lottery which is conventionally played by visiting a specific cite can be substituted by a digital lottery which can be played by using the portable telephone. In such a system, since a user can play a lottery at any time, a user's interest can be attracted. Additionally, since this system enables an automatic lottery by a computer, this system can contribute to an increase in efficiency of the lottery system.

The combination of the portable telephone and the attachment enables effective suggestions to a user. By positively using a display or a voice output of widely spread portable telephone, the combination of the portable telephone and the attachment according to the present invention enables even confirmation of services to a user by borrowing a portable telephone owned by other users.

The user can receive various kinds of services by connecting one of various types of inexpensive attachments to the portable telephone possessed by the user. Accordingly, the attachment is economical in view of the user side.

Since the attachment does not deteriorate integrity of the portable telephone when the attachment is mounted to portable telephone, the attachment provides convenience more than other portable communication devices which are used in combination with a portable telephone. Since the programs installed in the attachment is changeable in response to various kinds of services, there is no need to possess a plurality of attachments, and, thus, the attachment according to the present invention provides convenience.

Additionally, since an arbitrary inputting and outputting means of the portable telephone can be used, an effective suggestion and information can be provided to each user.

In view of the provider of services, use of the attachment can provide a merit in that the provider is required to develop only the attachment since the portable telephone has already become popular. That is, the development cost can be lower than a case in which a portable communication device is newly developed.

Additionally, since the portable telephone is popular, this gives spreading effect to the service.

It is considered that new devices interacting with a real world such as GPS appears on the market. If such condition happens, an inexpensive attachment and an application program used with such a new device can be developed in accordance with the specification of connection of the attachment without changing the portable telephone itself.

Additionally, by changing the application program installed in the attachment, the portable telephone, which is carried in a casual manner, can be changed so that the portable telephone can be used in various aspects of services.

According to the attachment for the portable telephone, the portable telephone which is exclusively used as communication means can be used as a portable communication device for receiving the above-mentioned services by using the attachment connectable to the portable telephone without deteriorating an appearance of the portable telephone.

The present invention is limited to the specifically disclosed embodiments, and variations and modifications may be made without departing from the scope of the present invention.

The present application is based on Japanese priority application No. 10-361615 filed on Dec. 18, 1998, the entire contents of which are hereby incorporated by reference.

What is claimed is:

1. A portable communication device for communicating with a remote communication terminal the portable communication device being configured and arranged to be used in a digital money system, comprising:
   a remote communication interface interfacing radio-frequency communication with a remote communication terminal;
   a short-distance communication interface interfacing wireless communication with a communication terminal located at a point of transaction involving the use of digital money;
   inputting unit inputting data or instruction information to said portable communication device;
   a memory storing the data input by the inputting unit or data received via said remote communication interface and said short-distance communication interface;
   a display unit displaying the data input by said inputting unit or data received via said remote communication interface and said short distance communication interface;
   an enciphering circuit enciphering data to be transmitted to the remote communication terminal via said remote communication interface and data to be transmitted via said short-distance communication interface;
   a deciphering circuit deciphering data received from the remote communication terminal via said remote communication interface and data received via said short-distance communication interface; and
   a controlling unit controlling each of said remote communication interface, said short-distance communication interface, said inputting unit, said memory, said display unit, said enciphering circuit and said deciphering circuit;
   wherein said enciphering circuit and deciphering circuit are constituted by an enciphering/deciphering processor, and an enciphering and deciphering method used by said enciphering/deciphering processor is changed by changing software installed in said enciphering/deciphering processor.

2. The portable communication device as claimed in claim 1, wherein said inputting unit includes at least one of voice inputting device and an operational key panel.

3. A digital money system for using digital money to pay for a purchase as service, comprising:
   a computer of a financial institution;
   a radio base station in communication with said computer of the financial institution;
   a store terminal receiving digital money data for payment; and
   a portable communication device in communication with said radio base station via a radio frequency, said portable communication device also in communication with said store terminal in a wireless manner; and
   wherein said portable communication device stores the digital money data transmitted from said computer of the financial institution after deciphering the digital money data; and
   said portable communication device transmits the digital money data for payment to said store terminal after enciphering the digital money data for payment;
   wherein said portable communication device comprises:
      a remote communication interface interfacing radio-frequency communication with said radio base station;
      a short-distance communication interface interfacing wireless communication with said store terminal located at a point of transaction involving the use of digital money;
      inputting unit inputting data or instruction information to said portable communication device;
      a memory storing the data input by the inputting unit or dab received via said remote communication interface and said short distance communication interface;
      a display unit displaying the data input by said inputting unit or data received via said remote communication interface and said short distance communication interface;
      an enciphering circuit enciphering data to be transmitted to said computer of the financial institution via said remote communication interface and data to be transmitted to said store terminal via said short-distance communication interface;
      a deciphering circuit deciphering data received from said computer of the financial institution via said remote communication interface and data received from said store terminal via said short-distance communication interface; and
      a controlling unit controlling each of said remote communication interface, said short-distance communication interface, said inputting unit, said memory, said display unit, said enciphering circuit and said deciphering circuit;
      wherein said enciphering circuit and deciphering circuit are constituted by an enciphering/deciphering processor, and an enciphering and deciphering method used by said enciphering/deciphering processor is changed by changing software installed in said enciphering/deciphering processor.

4. The digital money system as claimed in claim 3, wherein said store terminal includes customer information storing means for storing information regarding a customer so that, when the customer makes a payment by the digital money via said store terminal, said store terminal stores form a on regarding the payment in said customer information storing means, the information regarding the payment includes information regarding an item for which the payment is made, an amount of payment and date and time of the payment, and said store terminal transmits the information regarding the payment to said portable communication device together with store information to said short-distance communication interface of said portable communication device.

5. The digital money system as claimed in claim 4, wherein said portable communication device receives the information regarding the payment via said short-distance communication interface, and stores the information regarding the payment in said memory.

6. The digital money system as claimed in claim 5, wherein said portable communication device displays at least a part of the information regarding the payment on said display unit.

7. The digital money system as claimed in claim 6, wherein said portable communication device sends a request for service to said store terminal via said short-distance communication interface when an amount of payment or points exceeds a predetermined level, and said store terminal determines whether use of the digital money by said portable communication device satisfies a predetermined requirement so as to transmit digital data corresponding the requested service to said portable communication device when the use of the digital money by said portable communication device satisfies the predetermined requirement.

8. The digital money system as claimed in claim 5, wherein said portable communication device sends the information regarding the payment to said computer of the financial institution via said remote communication interface and said radio base station, and said computer of said financial institution produces a household account book based on the information regarding the payment sent from said portable communication device by using household account book software installed in said computer of the financial institution.

9. The digital none system as claimed in claim 8, wherein said computer of the financial institution send data corresponding to the household account book to a communication terminal of a user of said portable communication device so that the household account book is displayed on a computer or a television set connected to the communication terminal periodically or upon a request by the user.

10. A service providing system comprising:

a service provider terminal of a provider service;

a service center including service information storing means for storing information including information regarding various kinds of service which can be provided to a user, information regarding availability of service provided by the provider and information regarding message to be provided to the user, said service enter further including determining means for determining whether or not service can be provided to the user based on a present state of the user;

a radio base station connected to said service center; and a portable communication device comprising remote communication means for communication with said radio base station, said portable communication device further comprising inputting means for inputting information regarding a users state of feeling, wherein said portable communication device sends the information regarding the user's state of feeling to said service center by said remote communication means when the information regarding the user's state of feeling is input by said inputting means, wherein said service center determines % whether there is service which can be provided to the user by said determining means when sa service center receives the information regarding the user's state of feeling, and sends the message stored in said service information storing means to said portable communication device when the service which can be provided to the user is present; and wherein said portable communication device includes a specific key for inputting te user's state of feeling so that the user can input formation regarding the present state of the user by pressing the specific key.

11. The service providing system as claimed in claim 10, wherein said radio base station is installed at a plurality of locations so that a position of said portable communication device is determined by exchanging signals between said portable communication device and said radio base station, and said determining means determines whether or not the service which can be provided to the user based on positional information of said portable communication device.

12. The service providing system as claimed in claim 10, wherein said portable communication device further comprises short-distance communication means for communicating with said service provider terminal and storing means for storing user information, and wherein said portable communication device sends the user information stored in said storing means to said service provider terminal when said portable communication device receives a message to the user from said service center.

13. The service providing system as claimed in claim 12, wherein said portable communication device receives the message to the user from said service provider terminal and outputs the message by voice so that the user sends the user information stored in said storing means to said service provided terminal via said short-distance communication means so as to make a reservation after hearing the voice message.

14. The service providing system as claimed in claim 10, wherein said service center further comprises:

temporary telephone number setting and announcing means for setting a temporary telephone number to the service and announcing the temporary telephone number to a telephone station when service provided by said provider is time limited service; and temporary telephone number canceling means for canceling the temporary telephone number when the service is completed, wherein said service center provides information to said portable communication device by using the temporary telephone number and cancels the temporary telephone number by said temporary telephone number canceling means when the service is completed.

15. The service providing system as claimed in claim 14, wherein said provider of service sets the same temporary telephone number to each portable communication device when the same service is provide to each portable communication device.

* * * * *

UNITED STATES PATENT AND TRADEMARK OFFICE
CERTIFICATE OF CORRECTION

PATENT NO. : 6,885,877 B1
DATED : April 26, 2005
INVENTOR(S) : Toru Ozaki et al.

It is certified that error appears in the above-identified patent and that said Letters Patent is hereby corrected as shown below:

Column 23,
Line 25, after "terminal" insert -- , --;
Line 56, after "circuit" change ";" to -- , --;

Column 24,
Line 18, after "payment" change ";" to -- , --;
Line 30, change "dab" to -- data --;
Line 31, change "short distance" to -- short-distance --;
Line 51, change ";" to -- , --;
Line 63, change "form a on" to -- information --;

Column 25,
Line 36, change "digital none" to -- digital money --;
Line 37, change "send" to -- sends --;
Line 44, after "provider" insert -- of --;
Line 51, change "enter" to -- center --;
Line 59, change "users" to -- user's --;

Column 26,
Line 3, delete "%";
Line 5, change "sa" to -- said --;
Line 10, change ";" to -- , --;
Line 12, change "te" to -- the --;
Line 13, change "formation" to -- information --;
Line 20, change "the" to -- there is --;
Line 37, change "provided" to -- provider --;

UNITED STATES PATENT AND TRADEMARK OFFICE
CERTIFICATE OF CORRECTION

PATENT NO. : 6,885,877 B1
DATED : April 26, 2005
INVENTOR(S) : Toru Ozaki et al.

It is certified that error appears in the above-identified patent and that said Letters Patent is hereby corrected as shown below:

Column 26 (con't),
Line 52, after "number" insert -- , --;
Line 58, change "provide" to -- provided --.

Signed and Sealed this

Seventh Day of February, 2006

JON W. DUDAS
*Director of the United States Patent and Trademark Office*